United States Patent
Kawano

(10) Patent No.: US 9,539,973 B2
(45) Date of Patent: Jan. 10, 2017

(54) RIGHT FOOT PROTECTING STRUCTURE

(71) Applicant: TOYOTA JIDOSHA KABUSHIKI KAISHA, Toyota-shi, Aichi (JP)

(72) Inventor: Hiroto Kawano, Nisshin (JP)

(73) Assignee: TOYOTA JIDOSHA KABUSHIKI KAISHA, Toyota-Shi, Aichi-ken (JP)

(*) Notice: Subject to any disclaimer, the term of this patent is extended or adjusted under 35 U.S.C. 154(b) by 0 days.

(21) Appl. No.: 14/428,596

(22) PCT Filed: Apr. 26, 2013

(86) PCT No.: PCT/JP2013/062494
§ 371 (c)(1),
(2) Date: Mar. 16, 2015

(87) PCT Pub. No.: WO2014/174685
PCT Pub. Date: Oct. 30, 2014

(65) Prior Publication Data
US 2016/0039380 A1    Feb. 11, 2016

(51) Int. Cl.
*B60R 21/04* (2006.01)
*B60R 21/00* (2006.01)
*B60R 21/02* (2006.01)

(52) U.S. Cl.
CPC ........ *B60R 21/04* (2013.01); *B60R 2021/0046* (2013.01); *B60R 2021/0293* (2013.01)

(58) Field of Classification Search
CPC ............. B60R 21/04; B60R 2021/0046; B60R 2021/0293
See application file for complete search history.

(56) References Cited

U.S. PATENT DOCUMENTS

| 9,022,451 B2 * | 5/2015 | Ikeno ............... B60R 21/04 296/75 |
| 2014/0103680 A1 | 4/2014 | Ikeno et al. |
| 2014/0117715 A1 | 5/2014 | Ikeno et al. |

FOREIGN PATENT DOCUMENTS

| JP | 2006-248358 A | 9/2006 |
| JP | 2007-083902 A | 4/2007 |
| JP | 4122836 B2 | 7/2008 |
| JP | 4963818 B2 | 6/2012 |
| WO | 2012/176320 A1 | 12/2012 |
| WO | 2012/176321 A1 | 12/2012 |

* cited by examiner

*Primary Examiner* — Glenn Dayoan
*Assistant Examiner* — Melissa A Black
(74) *Attorney, Agent, or Firm* — Oliff PLC

(57) ABSTRACT

A floor portion structure that serves as a right foot protecting structure has a tibia pad that is provided at a portion, where a right foot of a vehicle occupant is placed, at a dash panel of a vehicle. In a case in which the tibia pad receives compressive load from the right foot at a time of a vehicle collision, the tibia pad is deformed in a shape that is inclined downwardly to the right such that a right side portion in a vehicle transverse direction at a region of contact with the right foot becomes lower than a left side portion, or is deformed such that the left side portion in the vehicle transverse direction at the region of contact with the right foot generates greater reaction force than the right side portion.

14 Claims, 15 Drawing Sheets

POSITION IN VEHICLE
TRANSVERSE DIRECTION

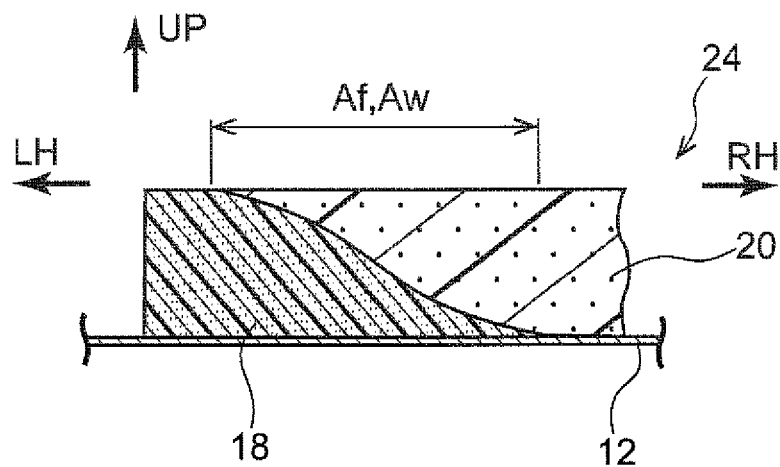
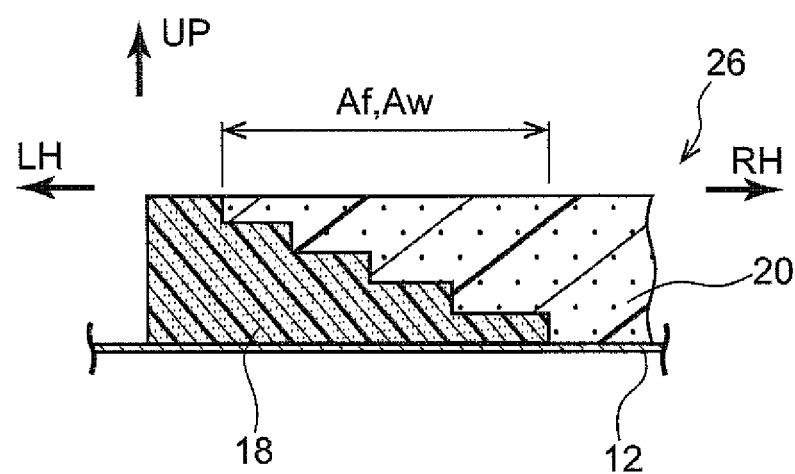

RIGHT FOOT PROTECTING STRUCTURE

TECHNICAL FIELD

The present invention relates to a right foot protecting structure.

BACKGROUND ART

Structures are known in which, due to ribs, that are formed in a lattice shape at a foot placement pad, being crushed by load from a foot portion, the foot portion that has sunken into the foot placement pad is restrained from the left and right by the remaining uncrushed ribs (see, for example, Japanese Patent No. 4122836).

SUMMARY OF INVENTION

Technical Problem

However, in the above-described structure, moments that suppress inward/outward rotation of the foot portion are generated by the restraining loads that are applied to the foot portion of the vehicle occupant from the left and the right, and therefore, there is room for improvement from the standpoint of protecting the foot portion.

An object of the present invention is to provide a right foot protecting structure that suppresses inward rotation of a right foot around the ankle at the time of a collision, and can improve the ability to protect the right foot.

Solution to Problem

A right foot protecting structure relating to a first aspect of the present invention comprises an impact absorbing portion that is provided at a portion, where a right foot of a vehicle occupant is placed, at a floor portion of a vehicle, and that, in a case of receiving compressive load from the right foot at a time of a vehicle collision, is deformed such that a right side portion in a vehicle transverse direction at a region of contact with the right foot becomes lower than a left side portion, or is deformed such that the left side portion in the vehicle transverse direction at the region of contact with the right foot generates greater reaction force than the right side portion.

In accordance with the above-described aspect, the impact absorbing portion, that receives load from the right foot of a vehicle occupant at the time of a vehicle collision, deforms and absorbs collision energy. Due to this deformation or accompanying the deformation, at the impact absorbing portion, the portion that is positioned relatively at the right side at the region of contact with the right foot of the vehicle occupant becomes lower than the portion that is positioned at the left side (the impact absorbing portion inclines downwardly to the right), or the impact absorbing portion applies a greater reaction force to the left side portion of the right foot than to the right side portion. Due to this shape of being deformed downwardly to the right of the impact absorbing portion, or the difference in the left and right reaction forces that are applied to the right foot, a moment in a direction against inward rotation is generated at the right foot of the vehicle occupant. Due to this moment, the right foot rotating inward around the ankle is suppressed, without relying on a structure that restrains the right foot of the vehicle occupant from the left and the right.

In this way, in the right foot protecting structure relating to the above-described aspect, inward rotation of the right foot around the ankle at the time of a collision is suppressed, and the ability to protect the right foot can be improved.

In the above-described aspect, the impact absorbing portion may be structured to include a tibia pad that is structured such that load that is needed for compressive deformation of a unit amount is greater at the left side portion in the vehicle transverse direction at the region of contact with the right foot than at the right side portion.

In accordance with the above-described aspect, the tibia pad that structures the impact absorbing portion has the characteristic that the deformation amount in the compression direction with respect to load, becomes greater at the right side portion than at the left side portion. Therefore, the reaction force that the right foot receives from the tibia pad becomes greater at the left side than at the right side, and the above-described moment in the direction against inward rotation of the right foot is generated.

In the above-described aspect, the tibia pad may be structured such that, by having portions where the load needed for compressive deformation of a unit amount differs, the load that is needed for compressive deformation of a unit amount becomes greater gradually or in a stepwise manner at the left side portion in the vehicle transverse direction at the region of contact with the right foot than at the right side portion.

In accordance with the above-described aspect, by arranging, in the vehicle transverse direction, portions at which the load needed for compressive deformation of a unit amount (the characteristic of the deformation amount with respect to load) differs, there can be obtained a structure in which the deformation amount in the compression direction with respect to load becomes greater gradually or in a stepwise manner at the right side portion than at the left side portion. The portions where the load needed for compressive deformation of a unit amount (the characteristic of the deformation amount with respect to load) differs may be formed integrally, or may be structured by combining portions that are formed as separate members.

The above-described aspect may be structured such that the tibia pad is structured due to a first member, and a second member at which the load that is needed for compressive deformation of a unit amount is greater than at the first member, being superposed such that a thickness of the first member becomes thicker gradually or in a stepwise manner at a right side than at a left side in the vehicle transverse direction.

In accordance with the above-described aspect, the first member that deforms relatively easily becomes thicker gradually or in a stepwise manner from the left side to the right side. Namely, for example, the boundary between the first member and the second member that are superposed together is made to be an inclined surface, a curved surface, a step shape, or the like. In the range in the vehicle transverse direction in which this boundary is made to be an inclined surface, a curved surface, a step shape or the like, the characteristic that the deformation amount in the compression direction with respect to load becomes greater at the right side portion than at the left side portion is obtained. Accordingly, in a uniform range in the vehicle transverse direction, inward rotation of the right foot around the ankle at the time of a collision is suppressed, and the ability to protect the right foot can be improved.

The above-described aspect may be structured such that the first member and the second member are respectively structured by foamed materials, and a foaming ratio of the foamed material that structures the first member is made to be greater than a foaming ratio of the foamed material that structures the second member.

In accordance with the above-described aspect, at the first member and the second member, the load that is needed for compressive deformation of a unit amount is set in accordance with the foaming ratio. Due thereto, the tibia pad that has the above-described characteristic can be manufactured easily.

In the above-described aspect, the tibia pad may be structured by a foamed material whose foaming ratio decreases gradually or in a stepwise manner from a right side in the vehicle transverse direction toward a left side.

In accordance with the above-described aspect, the tibia pad that has the above-described characteristic can be manufactured easily, by making the foaming ratio become smaller gradually or in a stepwise manner from the right side toward the left side at the tibia pad. For example, in the case of the former, the portions, at which the load needed for compressive deformation of a unit amount at the tibia pad differ, can be structured by a single member, and, in the case of the latter, the tibia pad can be structured by lining-up, in the vehicle transverse direction, plural members having different foaming ratios.

In the above-described aspect, the tibia pad may be structured such that a void ratio is greater at a right side than at a left side in the vehicle transverse direction.

In accordance with the above-described aspect, by making the void ratio be greater at the right side than at the left side at the tibia pad, the tibia pad that has the above-described characteristic can be manufactured easily. Further, the above-described moment in the direction against inward rotation can be set (adjusted) by, for example, the dimensions, the number (the density) or the like of the voids, such as holes or notches or the like, that are formed in the tibia pad.

The above-described aspect may be structured such that the tibia bad is formed from a single material, and is structured such that the void ratio is greater at the right side than at the left side in the vehicle transverse direction due to a void, that is deeper at the right side than at the left side in the vehicle transverse direction, being formed therein.

In accordance with the above-described structure, the void ratio is made to be larger at the right side than at the left side, by forming a void (e.g., a groove that opens in the compression direction, or the like), that becomes deeper at the right side than at the left side, in the tibia pad that is formed of a single material.

The above-described aspect may be structured such that the tibia bad is formed from a single material in which plural holes or notches are formed, and is structured such that the void ratio is greater at the right side than at the left side in the vehicle transverse direction due to dimensions, in a direction compressed by the right foot, of the plural holes or notches being formed to be greater at the right side than at the left side in the vehicle transverse direction.

In accordance with the above-described aspect, the void ratio is made to be larger at the right side than at the left side by forming plural holes or notches, that become larger at the right side than at the left side, in the tibia pad that is formed of a single material.

In the above-described aspect, the impact absorbing portion may be structured to include: a tibia pad that is structured to include a first portion, and a second portion that is thinner than a thickness of the first portion and that is disposed at a left side in the vehicle transverse direction with respect to the first portion, the tibia pad receiving the compressive load; and a supporting portion that is provided at the floor portion and that supports a portion, that includes the first portion and the second portion, of the tibia pad from an opposite side of a side of input of the compressive load.

In accordance with the above-described aspect, at the tibia pad that structures the impact absorbing portion, the first portion that is positioned relatively at the right side, and the second portion that is thinner than the first portion, are respectively supported by the supporting portion. When this tibia pad is completely crushed by compressive load from the right foot, because the protruding height, from the floor portion, of the supporting portion is higher at the left side than at the right side relatively, the tibia pad is in a deformed state of being inclined downwardly to the right in which the right side portion at the top surface thereof is lower than the left side portion. Due to the shape, that is inclined downwardly to the right, of the top surface of the tibia pad that arises due to this deformation, the above-described moment in the direction against inward rotation is generated at the right foot of the vehicle occupant.

The above-described aspect may be structured such that the supporting portion has plural convex portions whose protruding heights from the floor portion become lower at a right side than at a left side in the vehicle transverse direction, and the first right side portion and the second portion are formed due to plural notched portions, in which the plural convex portions are placed, being formed in the tibia pad.

In accordance with the above-described aspect, the formation region of the notched portion, in which is placed the convex portion whose protruding height from the floor portion is low, is made to be the first portion, and the formation region of the notched portion, in which is placed the convex portion whose protruding height is high, is made to be the second portion. Due to the structure in which the convex portions at the floor portion side are placed into the notched portions at the tibia pad side in this way, lateral offset of the tibia pad at the time of a collision can be suppressed, and the right foot of the vehicle occupant can be protected at the proper position in the vehicle transverse direction.

The above-described aspect may be structured such that the supporting portion is structured as a protruding portion whose protruding height becomes lower gradually or in a stepwise manner at a right side than at a left side in the vehicle transverse direction, and, at the tibia pad, a portion of varying thickness, that becomes thinner gradually or in a stepwise manner at the left side than at the right side in the vehicle transverse direction, includes the first portion and the second portion.

In accordance with the above-described aspect, adjustment, setting, and the like of the above-described moment in the direction against inward rotation can be carried out easily in accordance with the shape (the inclination angle and height) of the protruding portion side that is the supporting portion.

In the above-described aspect, the impact absorbing portion may be structured to include: a tibia pad that receives the compressive load from the right foot; and a stopper portion that is formed in the floor portion so as to not contact a bottom surface of the tibia pad, beneath a portion where the right foot of the vehicle occupant is placed at the tibia pad, and that supports the tibia pad, that is in a state of having been deformed by the compressive load so as to be lower at a right side than at a left side, from an opposite side of a side of input of the compressive load.

In accordance with the above-described aspect, the tibia pad that receives compressive load is mainly bendingly deformed until contacting (being supported by) the stopper portion, and is compressively deformed after contact with the stopper portion. At the time when the tibia pad contacts the stopper portion, the deformation (bending) of the right side portion is greater than the left side portion, and therefore, the surface of contact with the right foot becomes inclined downwardly to the right. Due to this deformed shape that is inclined downwardly to the right, the above-described moment in the direction against inward rotation is generated at the right foot of the vehicle occupant.

The above-described aspect may be structured such that the stopper portion is a bottom surface of a concave portion that is deeper at a right side than at a left side in the vehicle transverse direction, and a thickness of the tibia pad is constant in the vehicle transverse direction, and the tibia pad is supported by the floor portion at both sides in the vehicle transverse direction with respect to the concave portion.

In accordance with the above-described aspect, when the tibia pad that receives compressive load contacts the bottom surface (the stopper portion) of the concave portion, the surface of contact with the right foot at the tibia pad becomes a shape that is inclined so as to follow the bottom surface. Namely, a structure in which, at the time of hitting the bottom portion, the surface of contact with the right foot at the tibia pad is inclined downwardly to the right can be obtained easily.

Advantageous Effects of Invention

The present invention has the excellent effect of suppressing inward rotation of a right foot around the ankle at the time of a collision, and being able to improve the ability to protect the right foot.

BRIEF DESCRIPTION OF DRAWINGS

FIG. 10A is a cross-sectional view showing, in an enlarged manner, main portions of modified example 1-1 of the tibia pad that structures the right foot protecting structure relating to the first embodiment of the present invention.

FIG. 10B is a cross-sectional view showing, in an enlarged manner, main portions of modified example 1-2 of the tibia pad that structures the right foot protecting structure relating to the first embodiment of the present invention.

DESCRIPTION OF EMBODIMENTS

Figure 1:
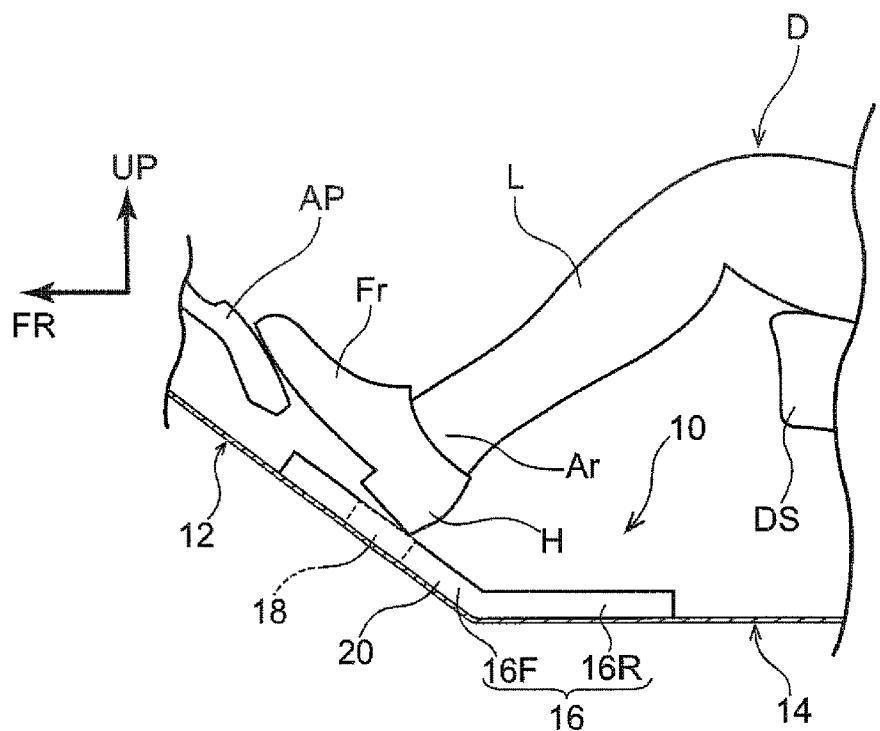
FIG. 1 is a side view showing the schematic overall structure of a right foot protecting structure relating to a first embodiment of the present invention.

A floor portion structure 10 that serves as a right foot protecting structure relating to an embodiment of the present invention is described on the basis of FIG. 1 through FIG. 9. Note that arrow FR that is marked appropriately in the drawings indicates the frontward direction of the vehicle longitudinal direction, arrow UP indicates the upward direction of the vehicle vertical direction, arrow RH indicates the right direction (a vehicle transverse direction one) side in a case of facing in the vehicle forward direction, and arrow LH indicates the left direction (a vehicle transverse direction other) side in a case of facing in the vehicle forward direction, respectively. In the following description, when longitudinal, vertical, and left and right directions are used, they mean the longitudinal of the vehicle longitudinal direction, the vertical of the vehicle vertical direction, and left and right when facing in the vehicle forward direction, unless otherwise stated.

First Embodiment

Overall Structure

The schematic overall structure of the floor portion structure 10 is shown in a side sectional view in FIG. 1. As shown in this drawing, the present floor portion structure 10 is applied to a portion in front of a driver's seat DS. Concretely, the floor portion structure 10 is applied to a portion that is downward and rearward with respect to an acceleration pedal AP that is operated by a right foot Fr of a driver D who is the vehicle occupant seated in the driver's seat DS.

The lower portion (hereinafter simple called "dash panel 12") of the dash panel 12 that structures a portion of the floor portion of the vehicle is positioned beneath the acceleration pedal AP. This dash panel 12 is inclined such that the lower side portion thereof is positioned further rearward than the upper side portion thereof. The front end of a floor panel 14 is continuous with (is connected to) the lower rear end of this dash panel 12.

Further, a tibia pad 16 that serves as an impact absorbing portion is disposed at the rear of the acceleration pedal AP. The tibia pad 16 is structured to include a front portion 16F that is superposed on the dash panel 12, and a rear portion 16R that is superposed on the floor panel 14. The front portion 16F of the tibia pad 16 is an inclined portion that runs along the dash panel 12, and includes a placement region (load input range Af that is described later) on which the right foot Fr of the driver D is placed.

Although not illustrated, the tibia pad 16 is covered by a floor mat, and, owing to the floor mat, there is a structure in which a step does not arise between the range at which the tibia pad 16 is set and other than the range at which the tibia pad 16 is set. Note that the tibia pad 16 may be set only at the right side in correspondence with the right foot Fr of the driver D, or may be set also at the left foot side of the driver D.

This tibia pad 16 absorbs a portion of the collision energy by receiving compressive load from the right foot Fr of the driver D and being deformed (broken).

[Detailed Structure of Tibia Pad]

Figure 4:
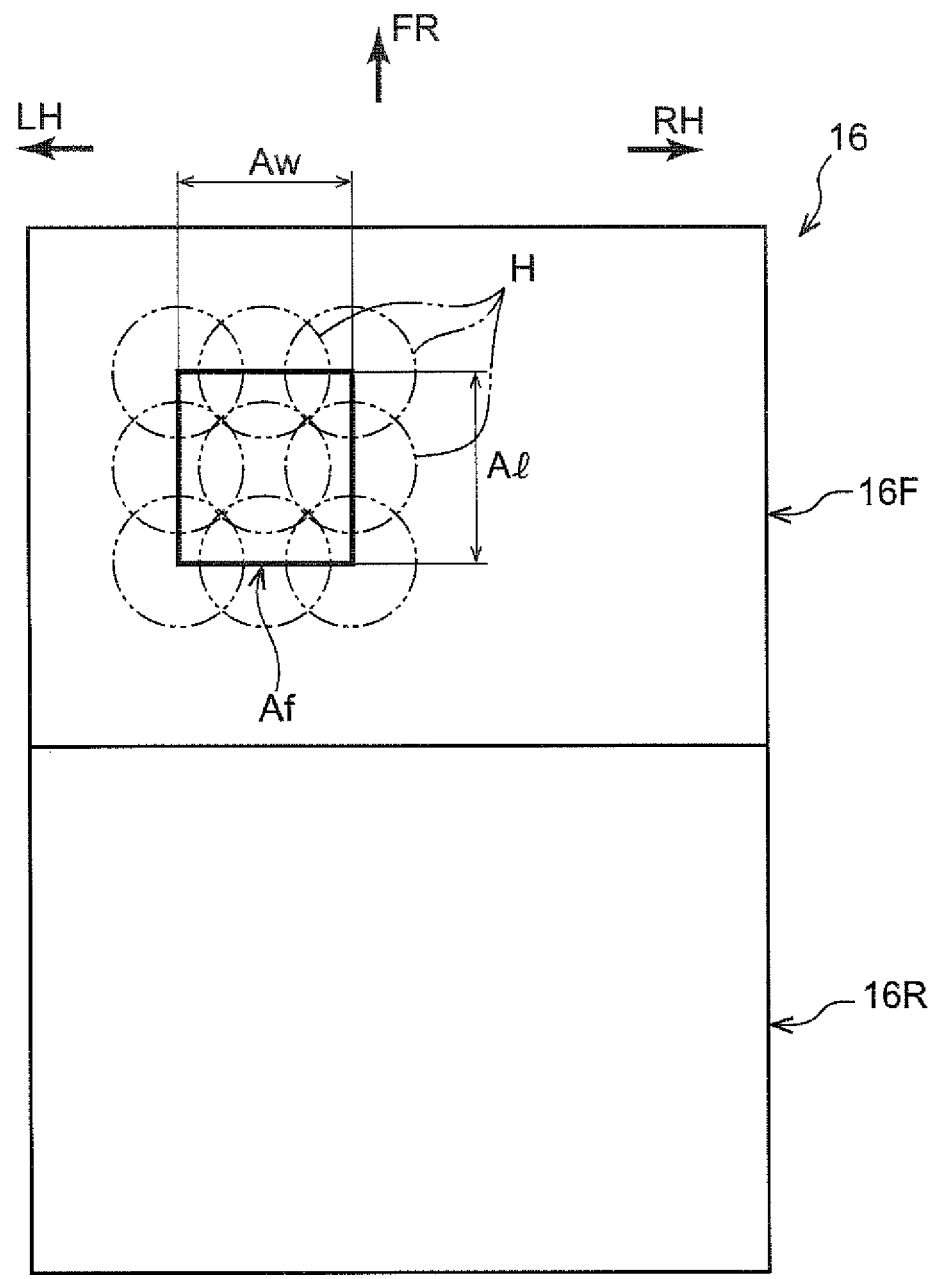
FIG. 4 is a schematic drawing for explaining a load input range to the tibia pad that structures the right foot protecting structure relating to the first embodiment of the present invention.

The load input range Af (see FIG. 4), on which the right foot Fr of the driver D is placed, is set at the front portion 16F of the tibia pad 16 relating to this embodiment. As shown in FIG. 4, the load input range Af is set as a dispersion range of placement positions that are centered around a heel H of the right foot Fr, and is a rectangular portion at which a dispersion range Al in the longitudinal direction and a dispersion range Aw in the vehicle transverse direction overlap. Note that the respective dispersion ranges Al, Aw are set in consideration of dispersion in placement positions of the heel H during driving depending on individual differences among the drivers D, and dispersion that is based on differences in advancing amounts and the like of the right foot Fr depending on the form of the collision (which will be explained later), and dispersion in the landing point of the heel H during a collision, and the like.

The load input range Af of this tibia pad 16 is made to be a 2-layer structural portion 22 of a taper portion 18T of an insert member 18 that is described later and a taper portion 20T of a main body member 20. The insert member 18 that serves as a second member is structured of a material at which the load (deformation resistance) needed for compressive deformation of a unit amount is large (a material that is hard), as compared with the material that structures the main body member 20 that serves as a first member. Concrete description is given hereinafter.

Figure 2:
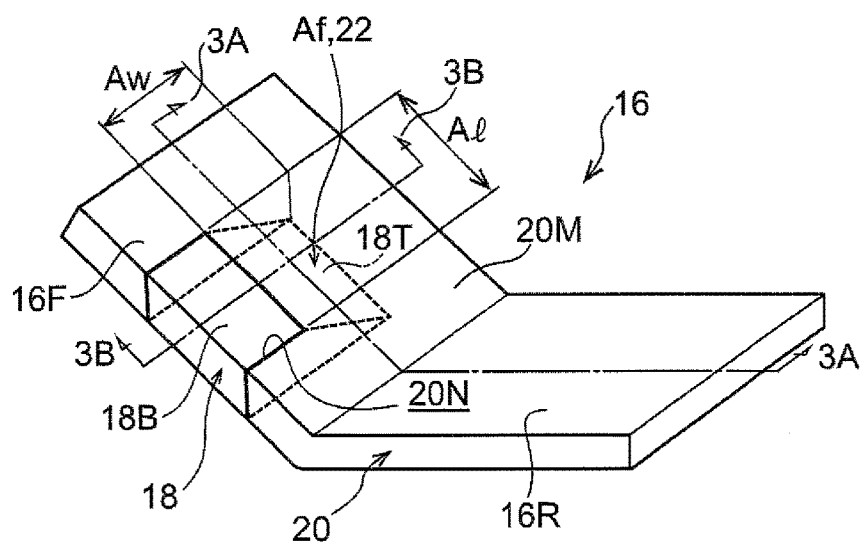
FIG. 2 is a perspective view showing a tibia pad that structures the right foot protecting structure relating to the first embodiment of the present invention.
Figure 3A:
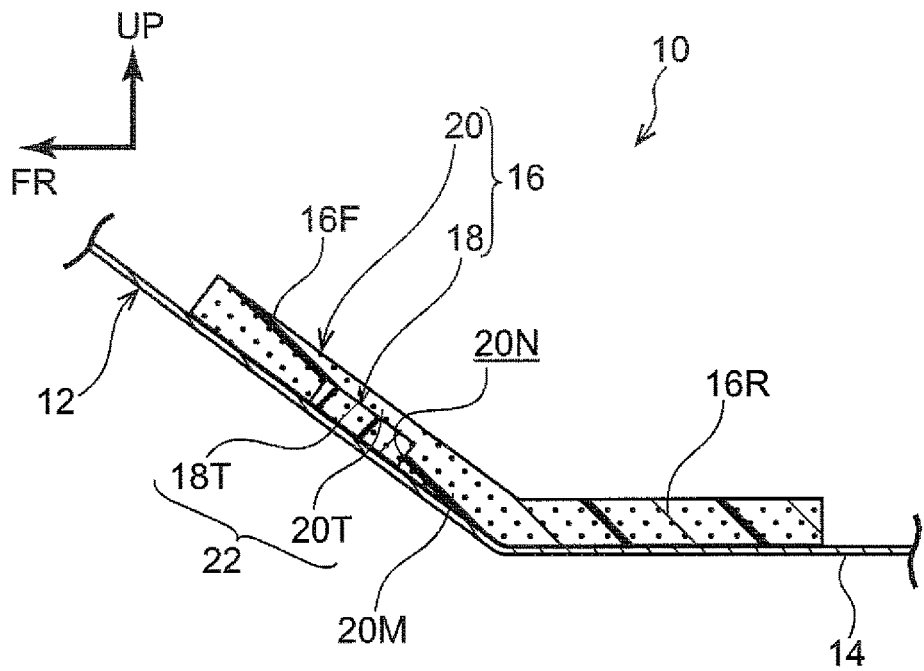
FIG. 3A is a cross-sectional view along line 3A-3A of FIG. 2.
Figure 3B:
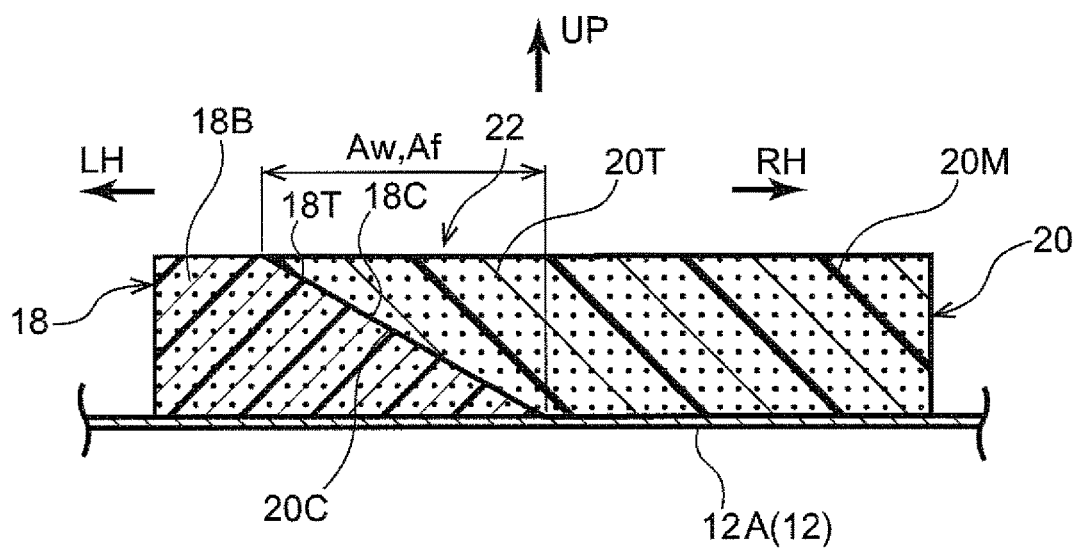
FIG. 3B is a cross-sectional view showing, in an enlarged manner, the cross-section along line 3B-3B of FIG. 2.

As shown in FIG. 2, the insert member 18 is structured with the main portions thereof being a base portion 18B whose thickness is constant, and the taper portion 18T whose thickness gradually becomes thinner from the left end side toward the right end side. As shown in FIG. 3B as well, the base portion 18B structures the portion at the left end side of the insert member 18, and the thickness thereof is the same as the thickness of the front portion 16F of the tibia pad 16. In other words, the base portion 18B structures a portion of the tibia pad 16 without being superposed with the main body member 20.

As shown in FIG. 4, the set range of the taper portion 18T substantially coincides with the load input range Af. As shown in FIG. 2 and FIG. 3B, the bottom surface of the taper portion 18T is flush with the base portion 18B, and the top surface is made to be an inclined surface 18C that is inclined so as to become gradually lower (so as to approach the dash panel 12) toward the right. The thickness (the positions of the upper and lower ends) of the left end of the taper portion 18T coincides with the thickness (the positions of the upper and lower ends) of the base portion 18B, and the thickness of the right end is substantially 0.

On the other hand, the main body member 20 structures the portion, that is other than the portion structured by the insert member 18, at the tibia pad 16. Namely, the tibia pad 16 is structured due to the insert member 18 being inserted in a notched portion 20N of the main body member 20. More concretely, the main body member 20 is structured with the main portions thereof being a main body portion 20M whose thickness is uniform, and the taper portion 20T that serves as a first member and that is superposed on the taper portion 18T of the insert member 18 so as to form a two-layer structure. The thickness (the positions of the upper and lower ends) of the main body portion 20M substantially coincides with the thickness (the positions of the upper and lower ends) of the base portion 18B of the insert member 18.

Namely, the thickness (the positions of the upper and lower ends) of the right end of the taper portion 20T coincides with the thickness (the positions of the upper and lower ends) of the main body portion 20M, and the thickness of the left end is substantially 0. Further, the top surface of the taper portion 20T is flush with the main body portion 20M, and the bottom surface thereof is made to be an inclined surface 20C that is inclined so as to become gradually higher toward the left. Due thereto, the taper portion 20T is superposed on the taper portion 18T of the insert member 18 with the inclined surfaces 18C, 20C being the boundary, and structures the two-layer structural portion 22. The thickness (the positions of the upper and lower ends) of this two-layer structural portion 22 substantially coincides with the thicknesses (the positions of the upper and lower ends) of the base portion 18B and the main body portion 20M.

Due to the above, the load input range Af at the tibia pad 16 is structured such that, from the left end toward the right end, the thickness of the relatively firm (hard) insert member 18 gradually decreases and the thickness of the relatively flexible (soft) main body member 20 gradually increases. In other words, there is a structure in which, within the load input range Af, at the left side portion, the rate of area occupied by the insert member 18 in the thickness direction is greater and the load that is needed for compressive deformation of a unit amount is larger (the left side portion is harder), than at the right side portion.

Figure 5A:
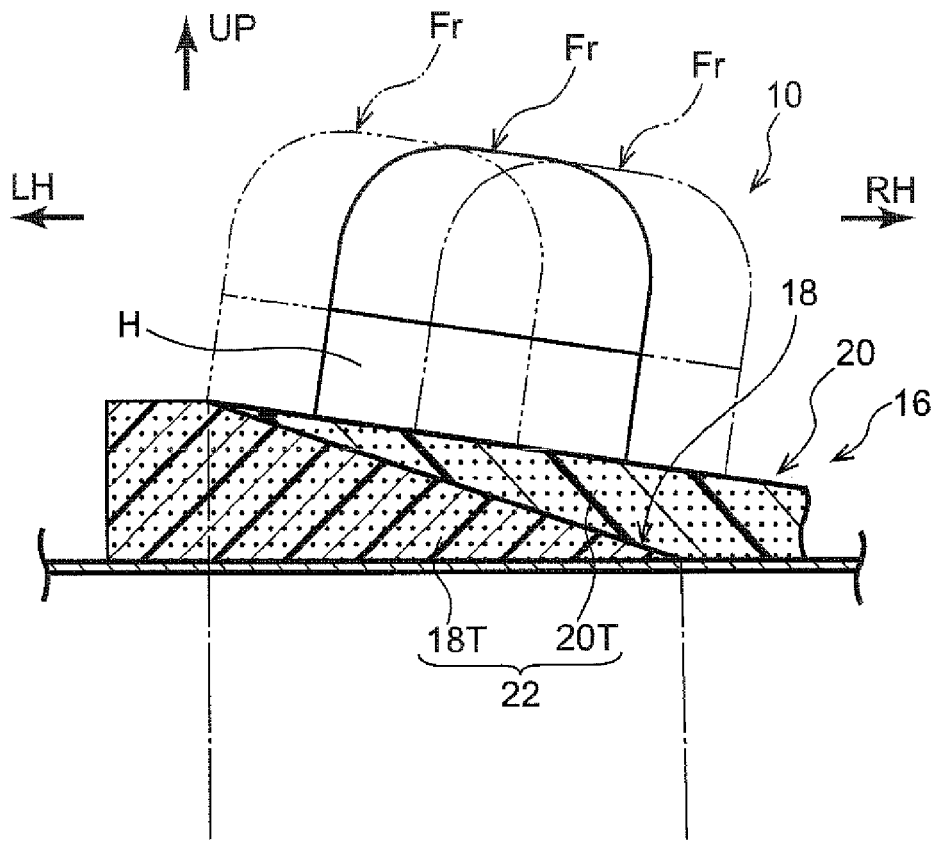
FIG. 5A is a cross-sectional view that is seen from a vehicle rear and schematically shows a deformed state of the tibia pad that structures the right foot protecting structure relating to the first embodiment of the present invention.
Figure 5B:
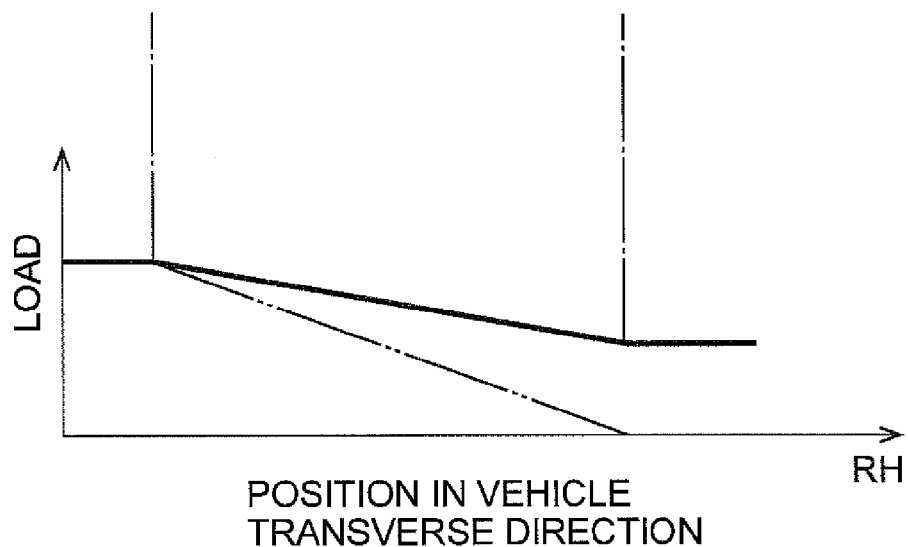
FIG. 5B is a graph showing the characteristic, with regard to vehicle transverse direction position, of load that is needed for deformation of a unit amount at each vehicle transverse direction position of the tibia pad that structures the right foot protecting structure relating to the first embodiment of the present invention.

Due thereto, as shown in FIG. 5B, there is a structure in which the load needed for compressive deformation of a unit amount gradually increases from the right end to the left end of the load input range Af. Note that the two-dot chain line shown in FIG. 5B illustrates the load that is needed for deformation of the insert member 18, and the solid line illustrates the load that is needed for deformation of the insert member 18 and the main body member 20. Further, due to this characteristic, there is a structure in which, when the tibia pad 16 receives uniform surface pressure at a portion of the two-layer structural portion 22, as shown in FIG. 5A, at least in the range that receives surface pressure, the amount of compressive deformation is larger at the right side than at the left side, i.e., the tibia pad 16 deforms in a shape that inclines downwardly to the right.

Here, the insert member 18 and the main body member 20 are both structured as foamed materials that are formed by foaming a common material such as urethane or the like, and there is a structure in which, by making the respective foaming ratios thereof be different, the load that is needed for compressive deformation of a unit amount differs. In this embodiment, the foaming ratio of the insert member 18 is set to be small as compared with the foaming ratio of the main body member 20.

[Operation]

Operation of the first embodiment is described next.

At the time of a front collision of the vehicle, the driver D who is seated in the driver's seat DS moves forward relative to the vehicle body. Here, a full overlap front collision, an offset collision, a small overlap collision, an oblique collision (MDB oblique collision, oblique collision) and the like are examples of the form of a front collision. A small overlap collision is a collision in which, for example, the overlap amount in the vehicle transverse direction with the other party in the collision as stipulated by IIHS is less than or equal to 25% of a front collision of an automobile. For example, a collision toward a vehicle transverse direction outer side with respect to a front side member that is a vehicle body skeleton falls within the purview of a small overlap collision. In this embodiment, as an example, a small overlap collision at a relative velocity of 64 km/hr is supposed. Further, an oblique collision is, for example, obliquely forward as stipulated by NHTSA (as an example, a collision in which the relative angle with the other party in the collision is 15° and the amount of overlap in the vehicle transverse direction is around 35%). In this embodiment, as an example, an oblique collision at a relative velocity of 90 km/hr is supposed.

Figure 6A:
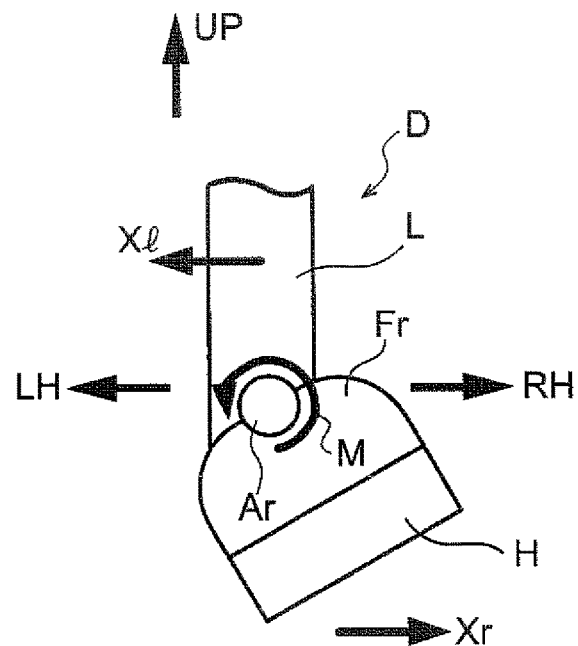
FIG. 6A is a schematic drawing for explaining a mechanism for generating a moment that inwardly rotates a right foot of a vehicle occupant.

Further, when compressive load Fc is inputted to the tibia pad 16 from the heel H of the right foot Fr of the driver D who moves forward relative to the vehicle body as described above, a portion of the collision energy is absorbed by deformation of the tibia pad 16. At this time, when the vehicle body is deformed such that the dash panel 12 moves relatively toward the right side (refer to arrow Xr of FIG. 6A) and the driver D moves relatively toward the left side (refer to arrow Xl of FIG. 6A), a moment M in a direction of causing the right foot Fr to rotate inward around ankle Ar is generated as shown in FIG. 6A. It is easy for the moment M to arise particularly in cases of the above-described oblique collision. Note that inward rotation means rotation around the ankle Ar in a direction in which the inner foot side (the arch side) heads downward and the outer foot side heads upward.

Figure 7A:
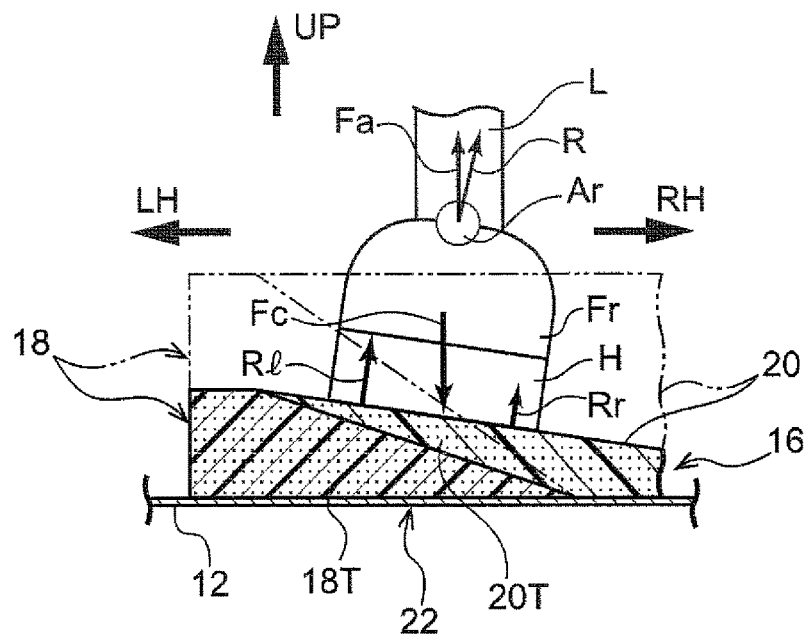
FIG. 7A is a cross-sectional view that is seen from the vehicle rear and schematically shows a protected state of the right foot by the right foot protecting structure relating to the first embodiment of the present invention.
Figure 7B:
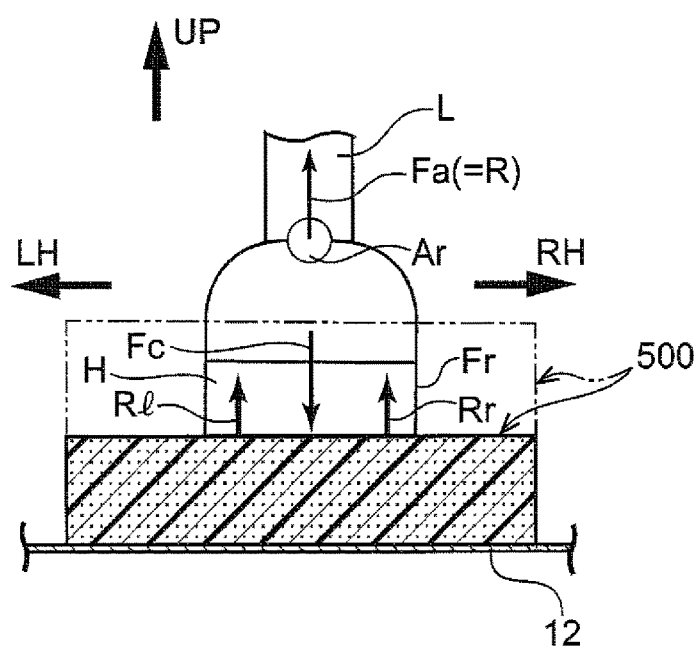
FIG. 7B is a cross-sectional view that is seen from the vehicle rear and schematically shows a protected state of the right foot by a right foot protecting structure relating to a comparative example.

Here, at a tibia pad 500 relating to a comparative example that is shown in FIG. 7B, the overall shape is similar to the tibia pad 16, but the load input range Af is structured of a single (having a constant foaming ratio) foamed material that is similar to the foamed material that structures the insert member 18. At this tibia pad 500, due to the compressive load Fc from the right foot Fr, the range of contact of the right foot Fr (the heel H) at the load input range Af is compressed substantially uniformly, as shown by the solid line, from the initial state that is shown by the imaginary line. Further, uniform reaction forces are applied to the right foot Fr at the right side and the left side. In this case, in a case in which the above-described moment M is generated, the right foot Fr of the driver D is turned inward by this moment M.

In contrast, in the floor portion structure 10, the two-layer structural portion 22, that is formed by the overlapping of the insert member 18 and the main body member 20, is set at the load input range Af of the tibia pad 16. Therefore, the tibia pad 16 can apply a cancelling moment Mc in the direction of cancelling the moment M, to the right foot Fr of the driver D. Here, a first mechanism that is due to the top surface (the surface of contact with the right foot Fr) of the two-layer structural portion 22 deforming in a shape that is inclined downwardly to the right, and a second mechanism that is due to the difference in reaction forces at the left and the right that are applied to the right foot Fr, are main examples of the mechanism that generates the cancelling moment.

To further describe the first mechanism, at the two-layer structural portion 22 of the tibia pad 16, accompanying the above-described energy absorption, the surface of contact with the right foot Fr is deformed in a shape that is inclined downwardly to the right as shown in FIG. 5A and FIG. 7A. Note that the imaginary line in FIG. 7A illustrates the initial state before deformation. When the compressive load Fc is (continues to be) inputted to this surface that is inclined downwardly to the right, the cancelling moment Mc is generated by the component of force, that is in the direction running along the inclined surface, of the reaction force that is applied to the right foot Fr (illustration is omitted).

Figure 6B:
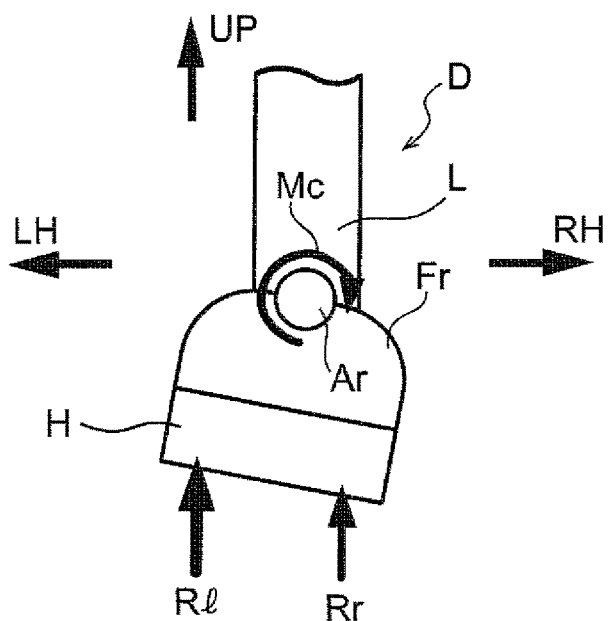
FIG. 6B is a schematic drawing for explaining a mechanism (second mechanism) for generating a cancelling moment that cancels the moment that inwardly rotates the right foot of the vehicle occupant.

On the other hand, to further describe the second mechanism, at the two-layer structural portion 22 of the tibia pad 16, as shown in FIG. 5B, the load that is needed for deformation of a unit amount is greater at the left side (the left side is harder) than the right side. Therefore, as shown in FIG. 6B, at the right foot Fr of the driver D, reaction force Rl that is applied to the left side portion is greater than reaction force Rr that is applied to the right side portion. Due to this difference in the left and right reaction forces, the cancelling moment Mc is generated. In particular, in cases in which the moment M in the direction of inwardly rotating the right foot Fr is large, the input load from the inner foot (the arch side) of the right foot Fr increases, and therefore, at this two-layer structural portion 22, the difference in the left and right reaction forces is large, and the cancelling moment Mc that is even greater is generated. Namely, even in a case in which the two-layer structural portion 22 were to not deform downwardly to the right (even in a case in which a cancelling moment due to the first mechanism were to not be generated or were to be small), the cancelling moment Mc that corresponds to the inputted compressive load Fc could be generated.

Figure 8:
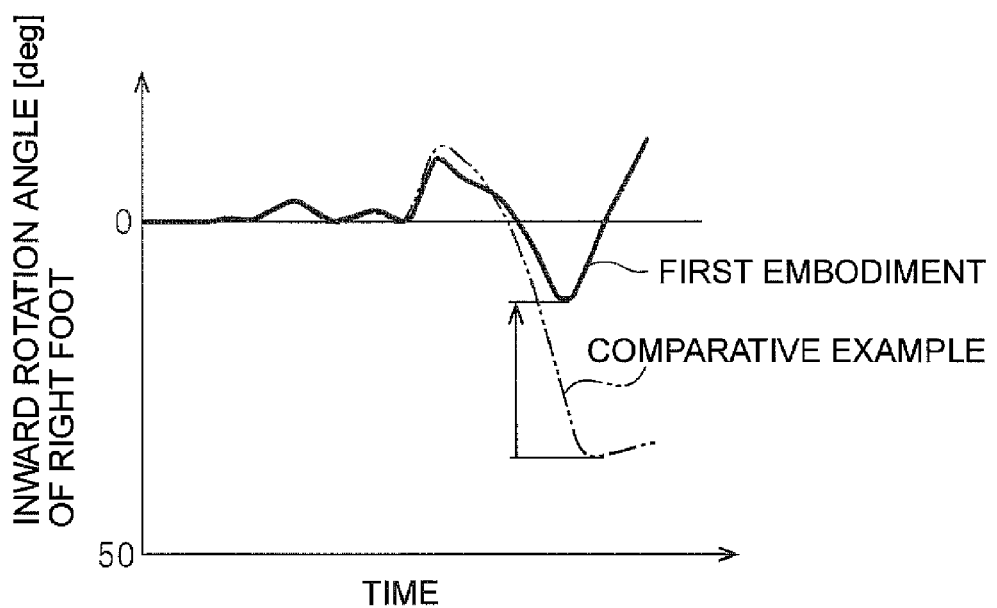
FIG. 8 is a graph that illustrates an inward rotation angle of the right foot of the vehicle occupant at the right foot protecting structure relating to the first embodiment of the present invention, in comparison with an inward rotation angle in the comparative example.

Due to the above-described cancelling moment Mc, the inward rotation of the right foot Fr of the driver D can be kept small, as compared with a case in which the tibia pad 500 relating to the above-described comparative example is employed. Here, FIG. 8 is a graph showing the results of simulation of angular displacement (the inward rotation angle) of the right foot Fr around the ankle Ar with respect to time at the time of an MDB oblique collision, of the tibia pad 16 relating to the present embodiment and the tibia pad 500 relating to the above-described comparative example. As shown in this drawing, it can be understood that the angular displacement of the right foot Fr around the ankle Ar is kept markedly small (approximately 12°) in the present embodiment, as compared with the case of the above-described comparative example (approximately 36°).

Further, as described above, at the floor portion structure 10, the cancelling moment Mc arises due to the deformed shape of being inclined downwardly to the right of the tibia pad 16, or the difference in the left and right reaction forces from the tibia pad 16. Namely, the right foot Fr rotating inwardly around the ankle Ar is suppressed due to deformation (the load characteristic) of the tibia pad 16, without relying on a structure that restrains the right foot Fr of the driver D from the left and right.

In this way, in the floor portion structure 10 relating to the first embodiment, inward rotation of the right foot Fr around the ankle Ar at the time of a collision is suppressed, and the ability to protect the right foot Fr can be improved. In particular, the cancelling moment Mc is generated in the process of the tibia pad 16 deforming (being crushed) by compressive load from the right foot Fr of the driver D, and therefore, inward rotation of the right foot can be suppressed while a portion of the collision energy is absorbed.

Further, the tibia pad 16 has the characteristic that, at the load input range Af, the load needed for compressive deformation of a unit amount is greater at the left side portion (the left side portion is harder) than the right side portion. Due thereto, a structure (function) that generates a cancelling moment by at least one of the above-described first mechanism and second mechanism can be obtained easily. In particular, the aforementioned characteristic (function) can be obtained by a simple structure, by the combination of plural members, i.e., the insert member 18 and the main body member 20, that have different characteristics (foaming ratios).

Moreover, at the two-layer structural portion 22 that is structured by superposing the taper portion 18T of the insert member 18 and the taper portion 20T of the main body member 20, within the entire range in the vehicle transverse direction of the load input range Af, the load needed for compressive deformation of a unit amount is greater at the left side portion than at the right side portion. Due thereto, as shown in FIG. 5A, even if the placed (contacting) position of the heel H of the right foot Fr with respect to the tibia pad 16 is offset in the vehicle transverse direction, deformation into a shape that is inclined downwardly to the right and a difference in the left and right reaction forces with respect to the right foot Fr can be produced. In this way, at the tibia pad 16 that has the above-described two-layer structural portion 22, the cancelling moment Mc in the direction of cancelling the moment M can be generated at the entire range in the vehicle transverse direction at the load input range Af.

Further, here, at the floor portion structure 10, as described above, the load input range Af (the two-layer structural portion 22) of the tibia pad 16 is deformed into a shape that is inclined downwardly to the right by the compressive load Fc from the right foot Fr. Therefore, axial force Fa, that is load that is applied in a compression direction (as buckling load) to a leg L (shin) of the driver D, is reduced.

Figure 9:
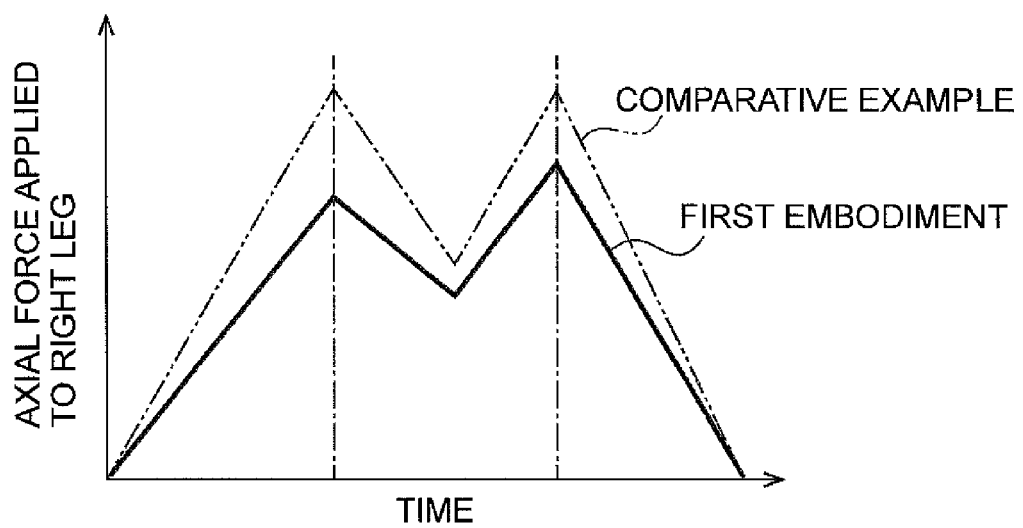
FIG. 9 is a graph showing axial force that is applied to a right leg of the vehicle occupant at the right foot protecting structure relating to the first embodiment of the present invention, in comparison with axial force in the comparative example.

To describe further, the tibia pad 500 relating to the comparative example that is shown in FIG. 7B is deformed (compressed) substantially uniformly by the compressive load Fc from the right foot Fr. Therefore, reaction force R of this compressive load Fc is applied substantially as is to the leg L as the axial force Fa. In contrast, at the tibia pad 16 that deforms in the above-described shape that is inclined downwardly to the right, as shown in FIG. 7A, the reaction force R is inputted at an incline with respect to the leg L. Therefore, the component (component of force) in the leg L direction of the reaction force R is applied to the leg L as the axial force Fa, and it can be understood that the axial force Fa is reduced as compared with the above-described comparative example. FIG. 9 is a graph showing results of simulation that compare the axial force Fa that is applied to the leg L of the driver D, in the above-described comparative example (refer to the two-dot chain line) and the present embodiment. As shown in this drawing, it is confirmed that, in the present embodiment, the axial force Fa is reduced as compared with the above-described comparative example.

Further, the load input range Af at the tibia pad 16 is made to be the two-layer structural portion 22 that is a superposed structure of the taper portion 18T of the insert member 18 and the taper portion 20T of the main body member 20 whose foaming ratio is higher (that is softer) than the insert member 18. Therefore, the minimum thickness needed of the tibia pad can be made to be thin, as compared with a case of obtaining a structure (function) that gives rise to the above-described cancelling moment Mc by, for example, differing the thickness of the tibia pad at respective portions in the vehicle transverse direction.

[Modified Examples of Tibia Pad]

An example has been illustrated in which, at the above-described tibia pad 16, the border between the insert member 18 and the main body member 20 is rectilinear. However, the present invention is not limited to this. It suffices for there to be, at the load input range Af, a structure in which the thickness of the insert member 18 decreases gradually or in a stepwise manner toward the right, and the thickness of the main body member 20 increases gradually or in a stepwise manner toward the right.

Modified Example 1-1

Accordingly, for example, as shown in FIG. 10A, a tibia pad 24 in which the boundary between the insert member 18 and the main body member 20 is a curved shape may be employed.

Modified Example 1-2

Or, for example, as shown in FIG. 10B, a tibia pad 26 in which the boundary between the insert member 18 and the main body member 20 is step-shaped may be employed.

The tibia pads 24, 26 relating to these modified examples have characteristics that are similar to the tibia pad 16, and achieve similar operation and effects.

Other Embodiments

Other embodiments are successively described hereinafter. Note that structures that are basically similar to structures of the embodiments that were described therebefore are denoted by the same reference numerals as the structures of the embodiments that were described therebefore, and description and illustration thereof may be omitted.

Second Embodiment

Figure 11:
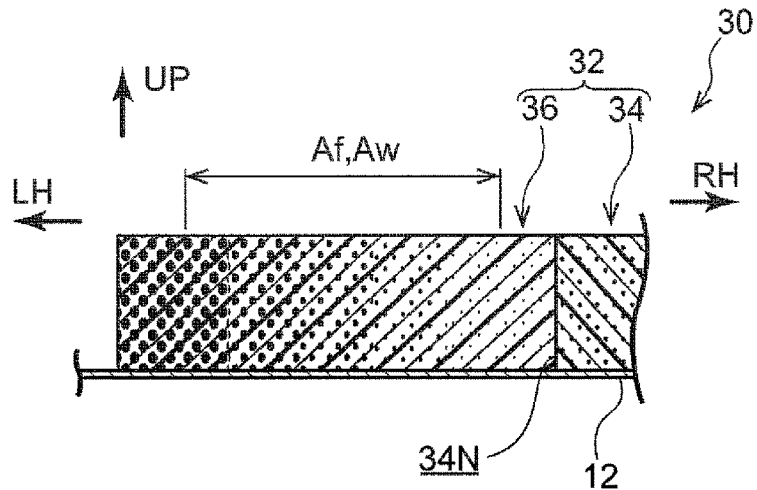
FIG. 11 is a cross-sectional view showing, in an enlarged manner, main portions of a tibia pad that structures a right foot protecting structure relating to a second embodiment of the present invention.

A floor portion structure 30 relating to a second embodiment of the present invention is described on the basis of FIG. 11. A portion, that includes the load input range Af, at a tibia pad 32 that structures the floor portion structure 30, is shown in a cross-sectional view in FIG. 11. As shown in this drawing, the portion, that structures the load input range Af, of the tibia pad 32 is structured by a single member, and, with regard to this point, differs from the first embodiment in which this portion is made to be the two-layer structural portion 22.

Concretely, the tibia pad 32 is structured with the main portions thereof being a main body member 34 in which a portion that includes the load input range Af is notched, and an insert member 36 that is fit-into a notched portion 34N of this main body member 34 and structures the load input range Af. The material that structures the main body member 34 is made to be the same as the material that structures the main body member 20.

The insert member 36 is formed in the shape of a parallelepiped block, and, in the longitudinal direction, is a dimension that coincides with the dispersion range Al in the longitudinal direction, and, in the vehicle transverse direction, is a dimension that juts-out toward the left and the right from the dispersion range Aw in the vehicle transverse direction. Accordingly, the insert member 36 is a shape that is slightly long in the vehicle transverse direction, as compared with a block body that is such that the base portion 18B and the taper portion 18T of the insert member 18 and the taper portion 20T of the main body member 20 are combined. Note that the left edge of the insert member 36 coincides with the left edge of the tibia pad 32 (the leftward-facing open end of the above-described notched portion of the main body member 34).

Further, the insert member 36 is a single member that is molded such that the foaming ratio gradually becomes larger from the left end toward the right end. Due thereto, the insert member 36 is a structure in which the load that is needed for compressive deformation of a unit amount gradually becomes smaller from the left side toward the right side. Such a portion in which the foaming ratio varies is formed at least at the load input range Af (the dispersion range Aw in the vehicle transverse direction).

Further, the foaming ratio of the portion, that is at the left side of the load input range Af, at the insert member 36 is made to be less than or equal to the foaming ratio at the left end of the load input range Af. Similarly, the foaming ratio of the portion, that is at the right side of the load input range Af, at the insert member 36 is made to be greater than or equal to the foaming ratio at the right end of the load input range Af. In this embodiment, the insert member 36 is structured of a material that is common to the material that structures the main body member 34, and the foaming ratio of the right end portion of the insert member 36 is equivalent to the foaming ratio at the main body member 34.

Due to the above, the characteristics (deformation, reaction force) of the tibia pad 32 relating to the second embodiment with respect to the compressive load Fc from the right foot Fr are characteristics that are similar to the characteristics of the tibia pad 16 relating to the first embodiment with respect to the compressive load Fc from the right foot Fr. Namely, the tibia pad 32 is structured so as to deform in a shape that is inclined downwardly to the right when the tibia pad 32 receives uniform surface pressure within the range at which the insert member 36 is set. Further, the floor portion structure 30 is structured so as to apply a larger reaction force at the left side portion than at the right side portion, to the right foot Fr that inputs the compressive load Fc to the insert member 36 of the tibia pad 32 that is disposed at the load input range Af. Namely, there is a structure in which the reaction force that is applied to the right foot Fr gradually becomes larger from the right end to the left end of the load input range Af.

Accordingly, in accordance with the floor portion structure 30 relating to the second embodiment as well, similar effects can be obtained by operation that is basically similar to the floor portion structure 10 relating to the first embodiment. Further, instead of the effect of obtaining a structure (function) of generating the cancelling moment Mc by the combination of the insert member 18 and the main body member 20 that have different characteristics (foaming ratios), the effect of being able to structure the load input range Af by a single member is achieved.

[Modified Example of Insert Member]

An example has been illustrated in which, at the above-described tibia pad 32, the insert member 36 is structured as a single member. However, it suffices for the insert member to be a structure in which the load needed for compressive deformation of a unit amount gradually increases from the right side toward the left side.

Modified Example 2-1

Figure 12:
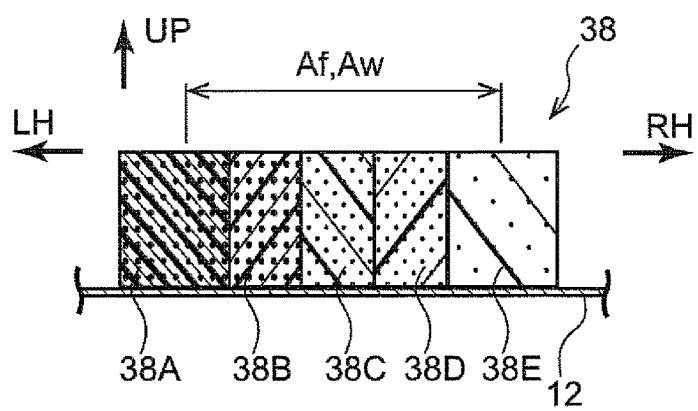
FIG. 12 is a cross-sectional view showing, in an enlarged manner, main portions of modified example 2-1 of an insert member that structures the right foot protecting structure relating to the second embodiment of the present invention.

Accordingly, for example, as shown in FIG. 12, plural foamed materials 38A~38E having different foaming ratios may be lined-up in the vehicle transverse direction so as to structure an insert member 38. Here, the widths of the foamed materials 38B~38D are set so as to be smaller than the foot width at the heel H of the right foot Fr (the foot width of a driver of a small build). Further, in this modified example, the foamed materials 38A~38E are lined-up from the left side in order from a small foaming ratio. The foaming ratios of the left end and the right end of the insert member 38 are the same as the foaming ratios of the left end and the right end of the insert member 36.

The insert member 38 relating to this modified example has a similar characteristic as the two-layer structural portion of the insert member 36, and exhibits similar operation and effects. Note that the number of (5 of) the plural foamed materials 38A~38E that structure the insert member 38 is an example, and the insert member 38 may be structured by plural foamed materials other than 5.

Third Modified Example

Figure 13:
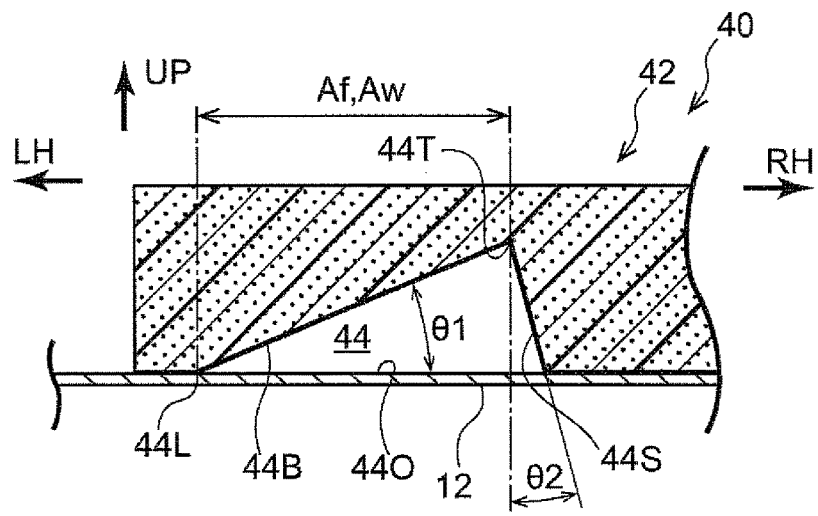
FIG. 13 is a cross-sectional view showing, in an enlarged manner, main portions of a tibia pad that structures a right foot protecting structure relating to a third embodiment of the present invention.

A floor portion structure 40 relating to a third embodiment of the present invention is described on the basis of FIG. 13. A portion, that includes the load input range Af, at a tibia pad 42 that structures the floor portion structure 40 is shown in a cross-sectional view in FIG. 13. As shown in this drawing, the tibia pad 42 differs from the first embodiment, in which this portion is made to be the two-layer structural portion 22, with regard to the point that the tibia pad 42 is structured by a single member on the whole.

This tibia pad 42 is, on the whole, structured as a single member that is formed from a foamed material of a substantially uniform foaming ratio. A notched portion 44, that serves as a void portion that opens downward, is formed in a range that includes the load input range Af. More concretely, as seen in the cross-section shown in FIG. 13, the notched portion 44 at the tibia pad 42 forms a triangular shape having a vertex portion 44T at the right end side, and is a space that is surrounded by a base surface 44B, a side surface 44S and an unillustrated pair of front and rear walls.

Further, the thickness of the tibia pad 42 becomes gradually thinner from an opening edge portion 44L at the left side of the notched portion 44 to the vertex portion 44T. In other words, the void ratio gradually increases from the opening edge portion 44L at the left side to the vertex portion 44T. Note that the void ratio in this embodiment is the proportion of the height of the notched portion 44 with respect to the thickness of the tibia pad 42 (the sum of the heights of the foamed material and the space of the notched portion 44). Further, the proportion of the capacity of the notched portion 44 with respect to the sum of the capacity of the notched portion 44 and the volume of the foamed material per unit width in the vehicle transverse direction, may be employed as the void ratio.

Further, in this embodiment, the positions, in the vehicle transverse direction, of the opening edge portion 44L at the left side of the notched portion 44 and the vertex portion 44T coincide with the left and right ends of the dispersion range Aw in the vehicle transverse direction. Due thereto, the tibia pad 42 is structured such that, when the tibia pad 42 receives the compressive load Fc from the right foot Fr, the tibia pad 42 deforms in a shape that is inclined downwardly to the right so as to fill-in the notched portion 44.

The inclination angle (i.e., the cancelling moment Mc that is generated) at this shape that is inclined downwardly to the right is set by angle θ1 that is formed by the open surface of the notched portion 44 (a general surface 12A of the dash panel 12) and the base surface 44B. Angle θ2, that is formed by the side surface 44S and a vertical line that passes through the vertex portion 44T, is set such that, at the time of the aforementioned rightward and downward deformation, the base surface 44B does not interfere with the side surface 44S. In other words, the angle θ2 is set such that the angle formed by the base surface 44B and the side surface 44S is greater than or equal to 90°, such that the vertex portion 44T can delineate a circular-arc-shaped locus that is centered around the opening edge portion 44L at the left side.

Further, the tibia pad 42 is structured so as to carry out absorption of collision energy after mainly deforming in the aforementioned shape that is inclined downwardly to the right. At this time, the tibia pad 42, that has deformed into the shape that is inclined downwardly to the right as described above, generates the cancelling moment Mc by the first mechanism.

Figure 14A:
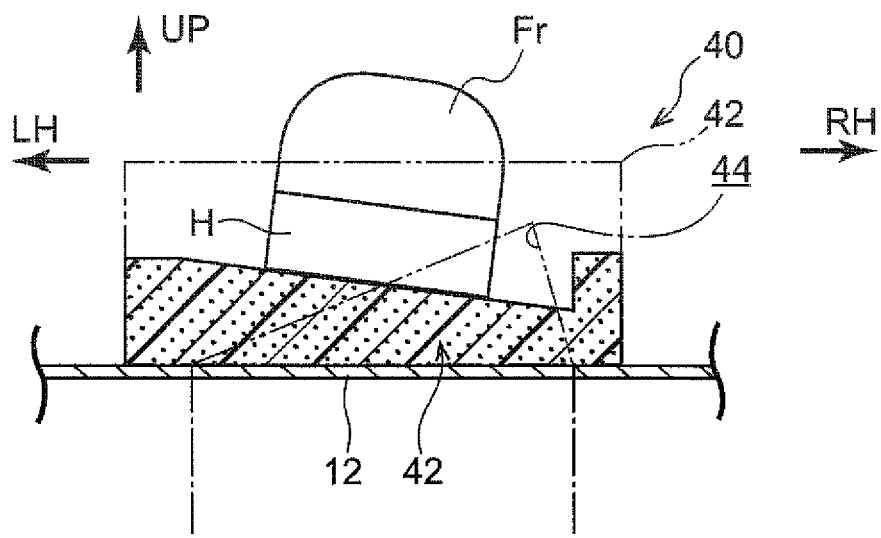
FIG. 14A is a cross-sectional view that is seen from the vehicle rear and schematically shows a deformed state of the tibia pad that structures the right foot protecting structure relating to the third embodiment of the present invention.
Figure 14B:
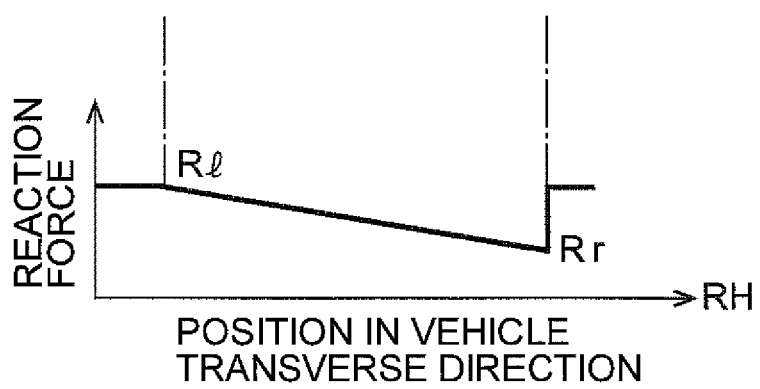
FIG. 14B is a graph showing the characteristic, with regard to vehicle transverse direction position, of load that is needed for deformation of a unit amount at each vehicle transverse direction position of the tibia pad that structures the right foot protecting structure relating to the third embodiment of the present invention.

Further, the tibia pad 42, that has become the shape that is inclined downwardly to the right at the load input range Af, is made to be thicker (the stroke of the energy absorption is larger) at the left side portion than at the right side portion. Therefore, as shown in FIG. 14B, the tibia pad 42 is structured such that the reaction force Rl that is applied to the left side portion is greater than the reaction force Rr that is applied to the right side portion. Accordingly, the tibia pad 42 generates the cancelling moment Mc also by the second mechanism.

Due to the above, in accordance with the floor portion structure 40 relating to the third embodiment as well, similar effects can be obtained by operation that is basically similar to the floor portion structure 10 relating to the first embodiment. Further, instead of the effect of being able to generate the cancelling moment Mc by the combination of the insert member 18 and the main body member 20 that have different characteristics (foaming ratios), the effect of being able to structure the load input range Af, that can generate the cancelling moment Mc, by a single member is achieved.

[Modified Examples of Tibia Pad]

An example is illustrated above in which, at the above-described tibia pad 42, the tibia pad 42 has the notched portion 44 that is singular and that is triangular when viewed in cross-section. However, the present invention is not limited to this. It suffices for the tibia pad to be a structure that is deformed in a shape that is inclined downwardly to the right due to compressive load from the right foot Fr, or applies larger reaction force at the left side portion than at the right side portion to the right foot Fr.

Modified Example 3-1

Figure 15A:
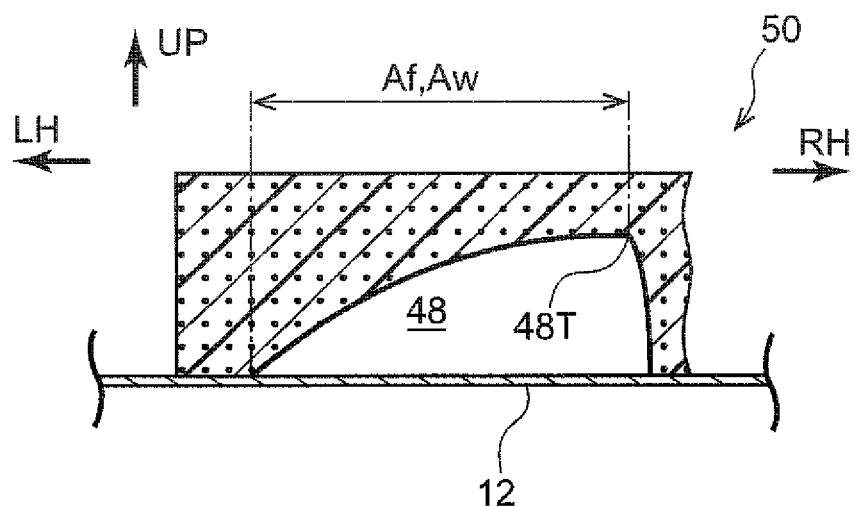
FIG. 15A is a cross-sectional view showing, in an enlarged manner, main portions of modified example 3-1 of the tibia pad that structures the right foot protecting structure relating to the third embodiment of the present invention.

Accordingly, for example, as shown in FIG. 15A, a tibia pad 50, in which a notched portion 48 is formed instead of the notched portion 44, may be employed. The tibia pad 50 differs from the notched portion 44 with regard to the point that the upper edges at the left and the right with respect to a vertex portion 48T of the notched portion 48 are formed in curved shapes that are convex upwardly as seen in cross-section. Further, although not illustrated, a tibia pad having notched portion whose upper edge is step-shaped may be employed.

Modified Example 3-2

Figure 15B:
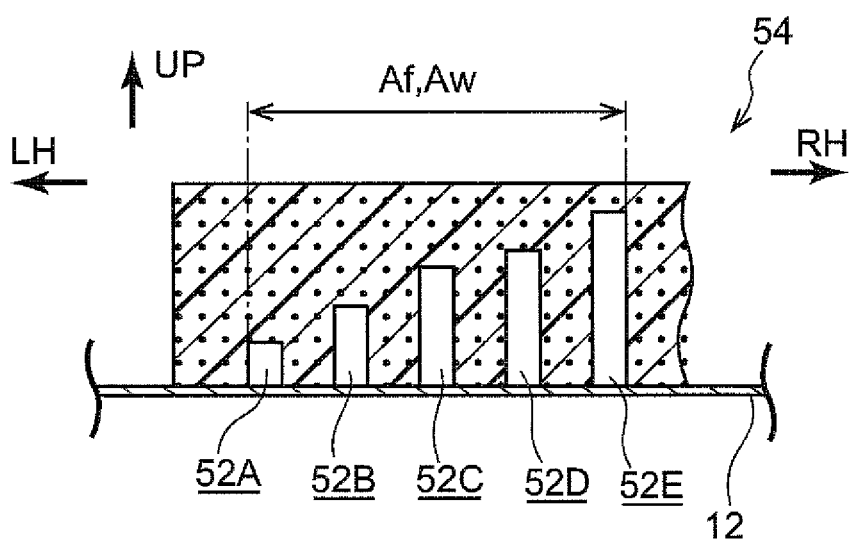
FIG. 15B is a cross-sectional view showing, in an enlarged manner, main portions of modified example 3-2 of the tibia pad that structures the right foot protecting structure relating to the third embodiment of the present invention.

Further, as shown in FIG. 15B, a tibia pad 54, in which plural notched portions 52A~52E are formed instead of the single notched portion 44, may be employed. The plural notched portions 52A~52E are respectively made to be void portions that open downward and that pass-through longitudinally, and are lined-up, from the left side, in order from the shallowest depth from the open end (lower end). In this modified example, the left edge of the notched portion 52A that is positioned at the left end coincides with the left end of the load input range Af (the dispersion range Aw in the vehicle transverse direction), and the right edge of the notched portion 52E that is positioned at the right end coincides with the right end of the load input range Af (the dispersion range Aw in the vehicle transverse direction).

Modified Example 3-3

Figure 15C:
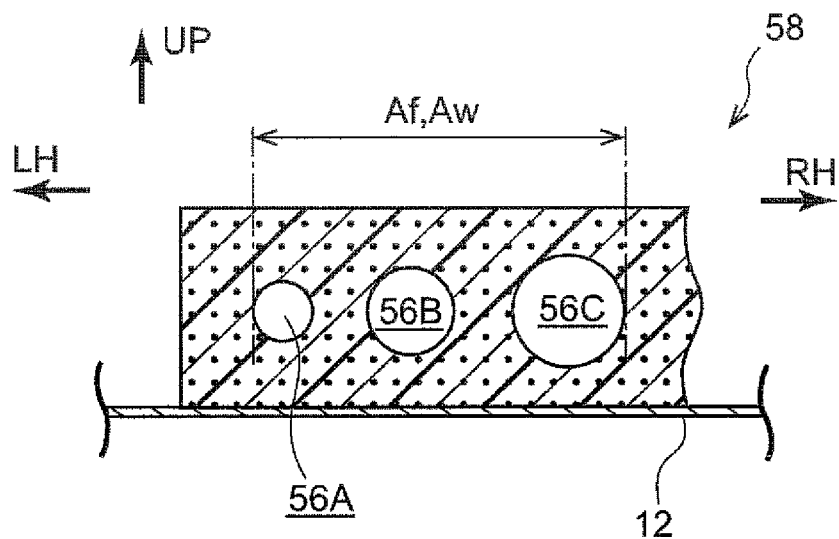
FIG. 15C is a cross-sectional view showing, in an enlarged manner, main portions of modified example 3-3 of the tibia pad that structures the right foot protecting structure relating to the third embodiment of the present invention.

Moreover, as shown in FIG. 15C, a tibia pad 58, in which cut-out portions 56A~56C serving as plural holes are formed instead of the plural notched portions 52A~52E, may be employed. The plural cut-out portions 56A~56C are respectively made to be void portions that are cylindrical and that pass-through longitudinally, and are lined-up, from the left side, in order from the smallest opening diameter. In this modified example, the left edge of the cut-out portion 56A that is positioned at the left end coincides with the left end of the load input range Af (the dispersion range Aw in the vehicle transverse direction), and the right edge of the cut-out portion 56C that is positioned at the right end coincides with the right end of the load input range Af (the dispersion range Aw in the vehicle transverse direction).

Modified Example 3-4

Figure 15D:
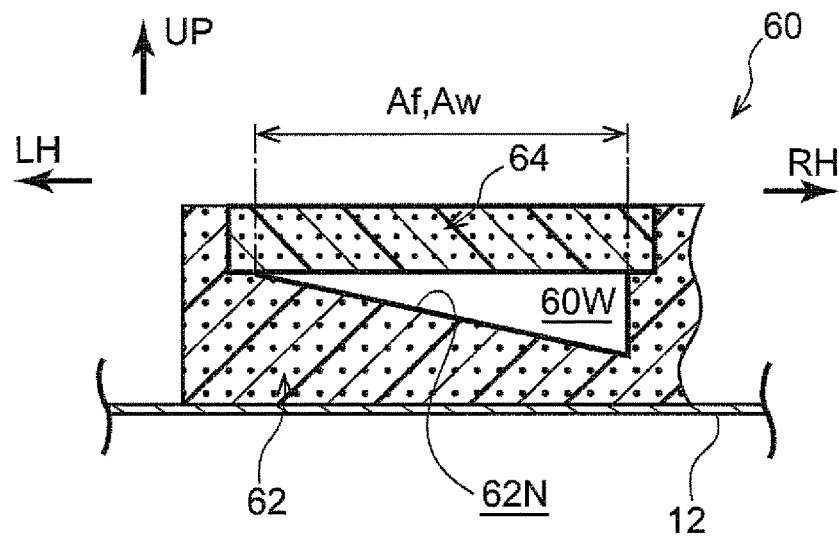
FIG. 15D is a cross-sectional view showing, in an enlarged manner, main portions of modified example 3-4 of the tibia pad that structures the right foot protecting structure relating to the third embodiment of the present invention.

Still further, as shown in FIG. 15D, a tibia pad 60, that has a window portion 60W that is surrounded by plural members, may be employed instead of the tibia pads 42, 54, 58 that are formed from a single member. In this modified example, the window portion 60W is formed by a notched portion 62N that opens upwardly being formed in a lower side member 62, and the notched portion 62N being closed by an upper side member 64 that is joined to the lower side member 62.

The window portion 60W is formed in a right triangular shape whose bottom side is the inclined side, when viewed in cross-section. At the left end, the opening width in the vertical direction is the minimum (0 in the present modified example), and, at the right end, the opening width in the vertical direction is the maximum. Further, the left and right edge portions of the window portion 60W coincide with the left and right ends of the load input range Af.

In this modified example, when the compressive load Fc from the right foot Fr is received, the upper side member 64 idly runs the window portion 60W and abuts the top surface of the region, where the notched portion 62N is formed, of the lower side member 62, and absorption of the collision energy starts mainly from this state. At this time, the top surface of the upper side member deforms in a shape that is inclined downwardly to the right at the load input range Af. The left side portion being thicker than the right side portion at the tibia pad 60 that is in this deformed state is similar to the above-described tibia pad 42.

The tibia pads 50, 54, 58, 60 relating to these modified examples have characteristics similar to the tibia pad 42, and achieve similar operation and effects. Note that, in modified examples 3-2 and 3-3, as the top surface of the tibia pad 54, 58 deforms in a shape that is inclined downwardly to the right (crushes the void portions), the portions between the notched portions 52A~52E and the portions between the cut-out portions 56A~56C are compressively deformed. Accordingly, the energy absorption amount in the initial stage of the collision can be made to be large as compared with at the tibia pad 42.

The load input range Af at the tibia pad 42, 50, 54, 58, 60 can also be interpreted as being a two-layer structure of a layer (the region where the notched portion 44 is formed) whose thickness gradually or intermittently becomes thicker from the right side toward the left side, and an air layer that deforms easily as compared with that region. In other words, a foamed material or the like that is relatively soft may be filled into the notched portions 44, 52, the cut-out portions 56, the window portion 60W.

Further, in the third embodiment and modified examples thereof, examples are illustrated in which the void ratios at the left and right are made to differ by the dimensions and the shapes of the notched portions. However, the present invention is not limited to this. For example, there may be a structure in which the void ratios at the left and right are made to differ by the density of placement of plural cut-out portions that have the same dimensions and shapes.

Fourth Embodiment

Figure 16:
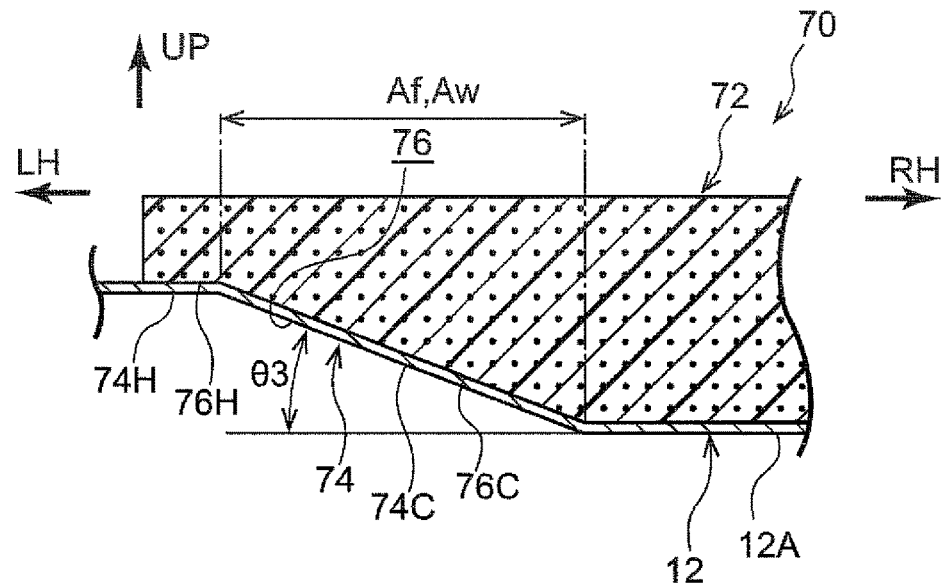
FIG. 16 is a cross-sectional view showing, in an enlarged manner, main portions of a right foot protecting structure relating to a fourth embodiment of the present invention.

A floor portion structure 70 relating to a fourth embodiment of the present invention is described on the basis of FIG. 16. A portion, that includes the load input range Af, at the floor portion structure 70 is shown in a cross-sectional view in FIG. 16. As shown in this drawing, the floor portion structure 70 is structured with the main portions thereof being a tibia pad 72 that is structured on the whole by a single member, and a protruding portion (projecting portion) 74 that serves as a supporting portion and is formed at the dash panel 12. The floor portion structure 70 differs with regard to this point from the first embodiment in which this portion is made to be the two-layer structural portion 22. Concrete description is given hereinafter.

The protruding portion 74 is structured to include an inclined portion 74C whose protruding height with respect to the general portion (the portion other than the protruding portion 74) of the dash panel 12 gradually becomes higher from the right end to the left end, and a high portion 74H that extends left from the left end of the inclined portion 74C so as to maintain the protruding height. The left and right end portions of the inclined portion 74C coincide with the left and right end portions of the load input range Af (the dispersion range Aw in the vehicle transverse direction). Further, the formation range in the longitudinal direction of the protruding portion 74 coincides with the front and rear ends of the load input range Af (the dispersion range Al in the longitudinal direction).

The tibia pad 72 is structured on the whole as a single member that is formed from a foamed material whose foaming ratio is substantially constant. A notched portion 76, that serves as a void portion and in which the protruding portion 74 is accommodated, is formed within a range that includes the load input range Af of the tibia pad 72. The notched portion 76 opens downward and leftward, and is surrounded by the inclined portion 74C of the protruding portion 74 that is accommodated at the interior thereof, and an inclined bottom surface 76C and a high bottom surface 76H that the high portion 74H contacts, and unillustrated front and rear walls. In this embodiment, the right side portion at the formation region of the inclined bottom surface 76C of the tibia pad 72 corresponds to a first portion that is relatively thick, and the left side portion at the formation region of the inclined bottom surface 76C of the tibia pad 72 corresponds to a second portion that is relatively thin. Accordingly, the formation region of the inclined bottom surface 76C at the tibia pad 72 corresponds to a portion of varying thickness.

This tibia pad 72 is supported from the opposite side (the lower side) of the compressive load Fc input side (the upper side) by the protruding portion 74 of the dash panel 12. Namely, the compressive load Fc from the right foot Fr that is inputted to the tibia pad 72 is supported by the protruding portion 74.

Figure 17:
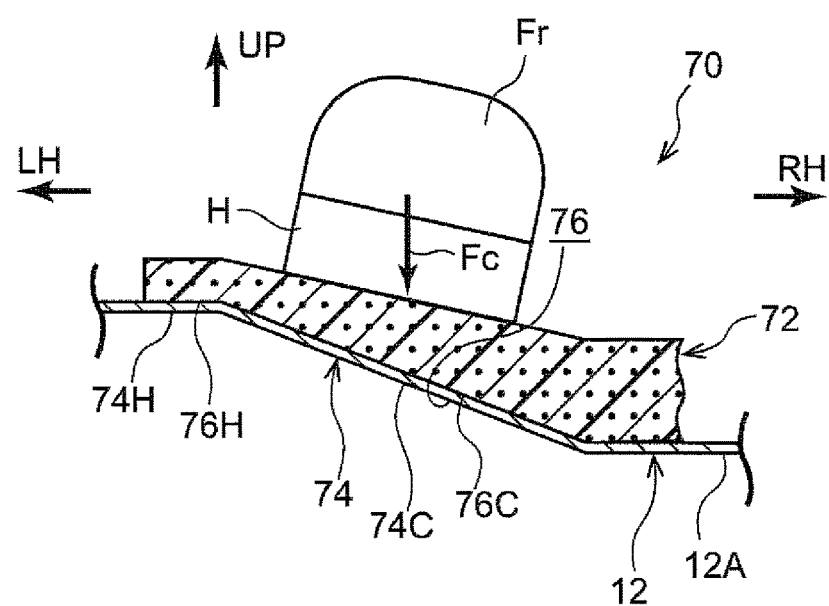
FIG. 17 is a cross-sectional view that is seen from the vehicle rear and schematically shows a deformed state of a tibia pad that structures the right foot protecting structure relating to the fourth embodiment of the present invention.

At the floor portion structure 70, as shown in FIG. 17, when the tibia pad 72 absorbs a portion of the collision energy (the tibia pad 72 is completely crushed) while receiving the compressive load Fc from the right foot Fr, the top surface of the tibia pad 72 is deformed in a shape that is inclined downwardly to the right. The cancelling moment Mc is generated by this deformed shape. Namely, the floor portion structure 70 relating to the present embodiment is structured so as to generate the cancelling moment Mc mainly by the first mechanism. Note that the inclination angle (i.e., the cancelling moment Mc that is generated) at the shape that is inclined downwardly to the right is set by θ3 that is formed by the inclined bottom surface 76C and the general surface 12A of the dash panel 12.

Accordingly, in accordance with the floor portion structure 70 relating to the fourth embodiment as well, similar effects can be obtained by operation that is basically similar to the floor portion structure 10, except for the operation and effects of generating (adding) the canceling moment Mc by the second mechanism. Further, instead of the effect of being able to generate the cancelling moment Mc by the combination of the insert member 18 and the main body member 20 that have different characteristics (foaming ratios), the effects is achieved of being able to structure the load input range Af, that can generate the cancelling moment Mc, by a single member.

[Modified Example of Floor Portion Structure]

An example has been illustrated in which, at the above-described floor portion structure 70, at the load input range Af, the boundary between the tibia pad 72 and the protruding portion 74 is formed rectilinearly when viewed in cross-section. However, it suffices for there to be a structure in which the top surface of the tibia pad becomes a shape that is inclined downwardly to the right, after energy absorption or in the final stage of the energy absorption.

Modified Example 4-1

Figure 18:
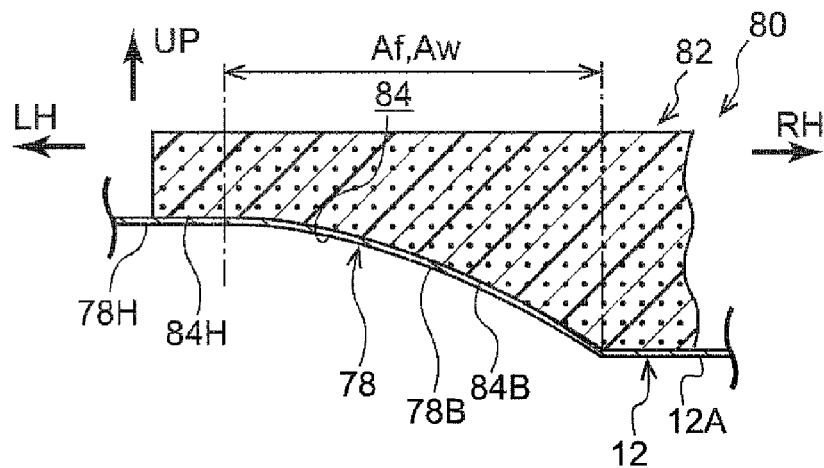
FIG. 18 is a cross-sectional view showing, in an enlarged manner, main portions of modified example 4-1 of the right foot protecting structure relating to the fourth embodiment of the present invention.

Accordingly, for example, as shown in FIG. 18, there may be a structure in which there is formed a protruding portion 78 that has a curved portion 78B, whose protruding height with respect to the general portion (the portion other than the protruding portion 74) of the dash panel 12 gradually becomes higher from the right end to the left end, and a high portion 78H. In a floor panel structure 80 relating to this modified example, the curved portion 78B is convex upward, and has a curved shape, as seen in cross-section, that has a tangent line that is common to the high portion 78H at the boundary with the high portion 78H. Further, a notched portion 84 of a tibia pad 82 that structures the floor portion structure 80 has a curved bottom surface 84B and a high bottom surface 84H that contact the curved portion 78B and the high portion 78H of the protruding portion 78 that serves as a supporting portion. In this embodiment, the right side portion at the formation range of the curved bottom surface 84B of the tibia pad 82 corresponds to the first portion that is relatively thick, and the left side portion at the formation range of the curved bottom surface 84B of the tibia pad 82 corresponds to the second portion that is relatively thin. Accordingly, the formation region of the curved bottom surface 84B at the tibia pad 82 corresponds to the portion of varying thickness. The floor portion structure 80 relating to the present modified example has similar characteristics as the floor portion structure 70.

Fifth Embodiment

Figure 19:
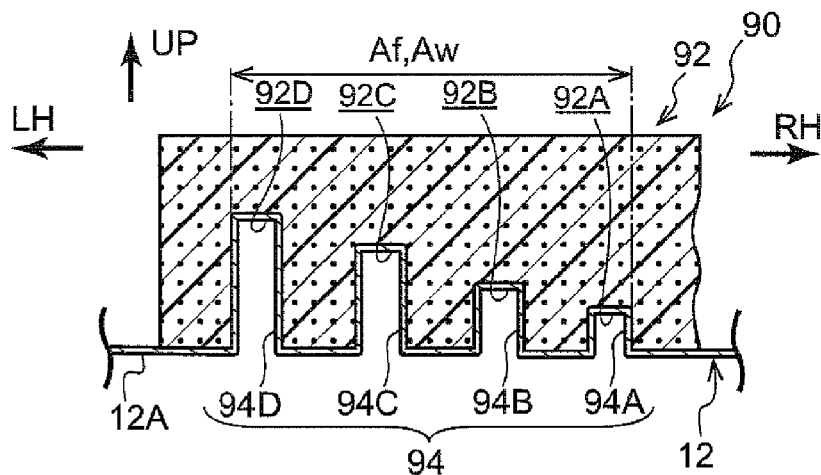
FIG. 19 is a cross-sectional view showing, in an enlarged manner, main portions of a right foot protecting structure relating to a fifth embodiment of the present invention.

A floor portion structure 90 relating to a fifth embodiment of the present invention is described on the basis of FIG. 19. A portion, that includes the load input range Af, at the floor portion structure 90 is shown in a cross-sectional view in FIG. 19. As shown in this drawing, the floor portion structure 90 differs from the fourth embodiment that has the supporting portion that is structured as the single protruding portion 74, with regard to the point that the floor portion structure 90 has a supporting portion 94 that is structured to include plural beads 94A~94D. Concrete description is given hereinafter.

The protruding heights, from the general surface 12A of the dash panel 12, of the plural (4 in this embodiment) beads 94A~94D that structure the supporting portion 94 are made to differ in a stepwise manner. The plural beads 94A~94D in this embodiment are disposed so as to be lined-up in the vehicle transverse direction such that the protruding heights, from the general surface 12A of the dash panel 12, gradually increase from the bead 94A at the right end toward the bead 94D at the left end. In this embodiment, the supporting portion 94 includes the portions between the beads 94A~94B.

Further, the floor portion structure 90 has a tibia pad 92 that is supported by the supporting portion 94 mainly at the load input range Af. Notched portions 92A~92D, in which the respective beads 94A~94D are placed (accommodated), are formed in the tibia pad 92. The top surfaces of the respective beads 94A~94D contact the bottom surfaces of the respective notched portions 92A~92D.

In this embodiment, of the formation regions of the pairs of notched portions that are adjacent in the vehicle transverse direction at the tibia pad 92, the formation region of the notched portion that is at the right side relatively is the first portion that is relatively thick, and the formation region of the notched portion that is at the left side relatively is the second portion that is relatively thin. Namely, the formation region of the notched portion 92A is the first portion, and the formation region of the notched portion 92D is the second portion. On the other hand, the formation region of the notched portion 92B is the second portion in relation to the formation portion of the notched portion 92A, and is the first portion in relation to the formation portion of the notched portion 92C. Similarly, the formation region of the notched portion 92C is the second portion in relation to the formation portion of the notched portion 92B, and is the first portion in relation to the formation portion of the notched portion 92D.

Further, in the present embodiment, (the contacting surfaces of) the right edge of the bead 94A at the right end and the right edge of the notched portion 92A coincide with the right end of the load input range Af (the dispersion range Aw in the vehicle transverse direction). Similarly, (the contacting surfaces of) the left edge of the bead 94A at the left end and the left edge of the notched portion 92A coincide with the left end of the load input range Af.

This tibia pad 92 is supported from the opposite side of the compressive load Fc input side (the top side) by the supporting portion 94 that is formed at the dash panel 12.

Namely, the compressive load Fc from the right foot Fr that is inputted to the tibia pad 92 is supported by the supporting portion 94. Due to this structure, at the floor portion structure 90, at the dispersion range Aw in the vehicle transverse direction, the top surface of the tibia pad 92 is deformed in a shape that is inclined downwardly to the right when the compressive load Fc from the right foot Fr is received.

Although not illustrated, in the floor portion structure 90, when a portion of the collision energy is absorbed (the tibia pad 92 is completely crushed) while the tibia pad 92 receives the compressive load Fc from the right foot Fr, the top surface of the tibia pad 92 is deformed in a shape that is inclined downwardly to the right. The cancelling moment Mc is generated by this deformed shape. Namely, the floor portion structure 90 relating to the present embodiment is structured so as to generate the cancelling moment Mc mainly by the first mechanism.

Accordingly, in accordance with the floor portion structure 90 relating to the fifth embodiment as well, similar effects can be obtained by operation that is basically similar to the floor portion structure 70 relating to the fourth embodiment.

Further, in the floor portion structure 90, the respective beads 94A~94D of the dash panel 12 are accommodated in the notched portions 92A~92D of the tibia pad 92. Therefore, offset, in the vehicle transverse direction and with respect to the vehicle body (the dash panel 12), of the tibia pad 92 at the time of a collision is prevented or effectively suppressed. Further, by forming the beads 94A~94D, the vehicle body rigidity at the range where (particularly the load input range Af of) the tibia pad 92 is placed can be improved. Namely, deformation of the dash panel 12 is suppressed, and this contributes the deforming the tibia pad 16 as planned.

[Modified Example of Floor Panel Structure]

An example has been illustrated in which the above-described floor panel structure 90 has the supporting portion 94 that has the four beads 94A~94D whose top surfaces are parallel to the dash panel 12. However, it suffices for the protruding heights, from the dash panel 12, of the beads that structure the supporting portion to be lower at the right side than at the left side relatively.

Modified Example 5-1

Figure 20:
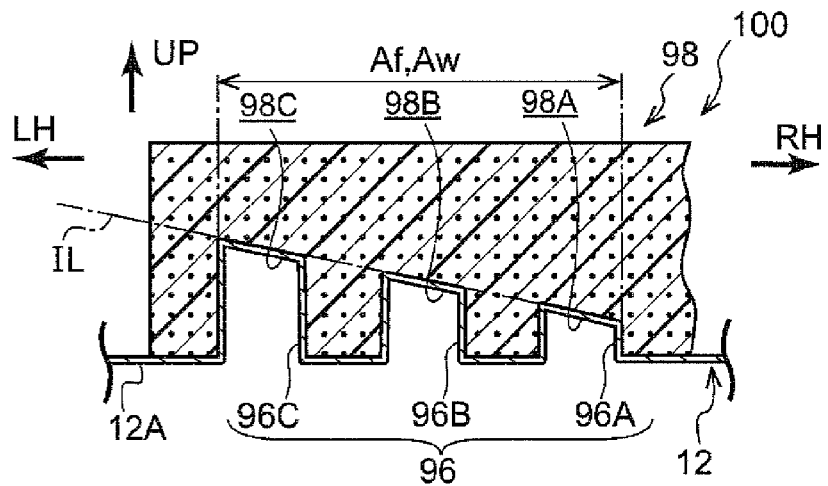
FIG. 20 is a cross-sectional view showing, in an enlarged manner, main portions of modified example 5-1 of the right foot protecting structure relating to the fifth embodiment of the present invention.

Accordingly, for example, as shown in FIG. 20, there may be a floor portion structure 100 having a supporting portion 96 that is structured to have three beads 96A~96C. Further, the protruding heights, with respect to the general surface 12A of the dash panel 12, of the respective top surfaces of the beads 96A~96C of the supporting portion 96 that structures the floor portion structure 100 are made to be higher at the left side than at the right side. Note that the left end (the highest position) of the top surface of a bead at the right side that is adjacent in the vehicle transverse direction is made to be lower than the right end (the lowest position) of the top surface of a bead at the left side. In this modified example, the top surfaces of the respective beads 96A~96C are formed along a common imaginary straight line (plane) that is inclined with respect to the general surface 12A of the dash panel 12 such that the right side is low.

Further, notched portions 98A~98C that accommodate the respective beads 96A~96C are formed in a tibia pad 98 that structures the floor portion structure 100. The top surfaces of the respective beads 96A~96C contact the bottom surfaces of the respective notched portions 98A~98C. In this embodiment, of the pairs of notched portions that are adjacent in the vehicle transverse direction at the tibia pad 98, the formation region of the notched portion that is at the right side relatively is the first portion that is relatively thick, and the formation region of the notched portion that is at the left side relatively is the second portion that is relatively thin. The floor portion structure 100 relating to the present modified example has characteristics similar to the floor portion structure 90.

Sixth Embodiment

Figure 21:
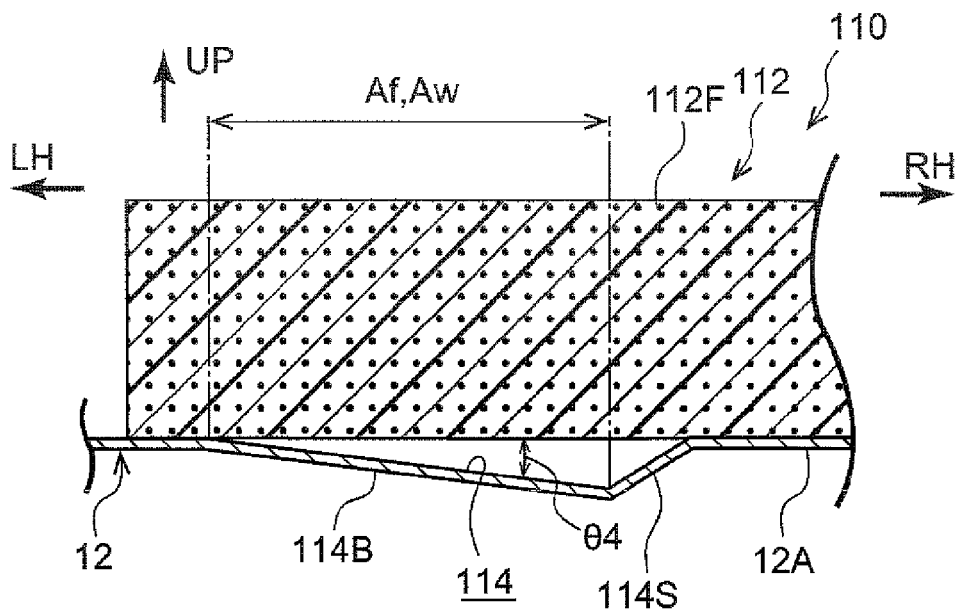
FIG. 21 is a cross-sectional view showing, in an enlarged manner, main portions of a right foot protecting structure relating to a sixth embodiment of the present invention.

A floor portion structure 110 relating to a sixth embodiment of the present invention is described on the basis of FIG. 21. A portion, that includes the load input range Af, at the floor portion structure 110 is shown in a cross-sectional view in FIG. 21. As shown in this drawing, the floor portion structure 110 differs from the first through fifth embodiments with regard to the point that the floor portion structure 110 has a tibia pad 112 whose thickness over the entire width in the vehicle transverse direction is constant and that is formed by a single member. Concrete description is given hereinafter.

The entire tibia pad 112, that includes a rear portion (not illustrated) and a front portion 112F that includes the load input range Af, is structured of a foamed material that is the same material as and has the same foaming ratio as the main body member 20 that structures the tibia pad 16.

On the other hand, a concave portion 114 is formed in the portion (position) of the dash panel 12 that corresponds to the load input range Af of the tibia pad 112. The concave portion 114 is a space that is surrounded by an inclined bottom wall 114B that serves as a stopper portion and gradually becomes lower from the open end at the left side toward the right side, an inclined side wall 114S that reaches from the right end of the inclined bottom wall 114B to the open end at the right side, and an unillustrated pair of front and rear wall portions. The open end at the left side of the concave portion 114 is the boundary between the inclined bottom wall 114B and the general surface 12A, and the open end at the right side of the concave portion 114 is the boundary between the inclined side wall 114S and the general surface 12A.

Further, at the floor portion structure 110, the open end at the left side of the concave portion 114 coincides with the left end of the load input range Af (the dispersion range Aw in the vehicle transverse direction). Further, the deepest portion of the concave portion 114, i.e., the boundary between the inclined bottom wall 114B and the inclined side wall 114S, coincides with the right end of the load input range Af (the dispersion range Aw in the vehicle transverse direction). Further, in the usual state (before a collision), the inclined bottom wall 114B and the inclined side wall 114S do not contact the bottom surface of the tibia pad 112.

Figure 22:
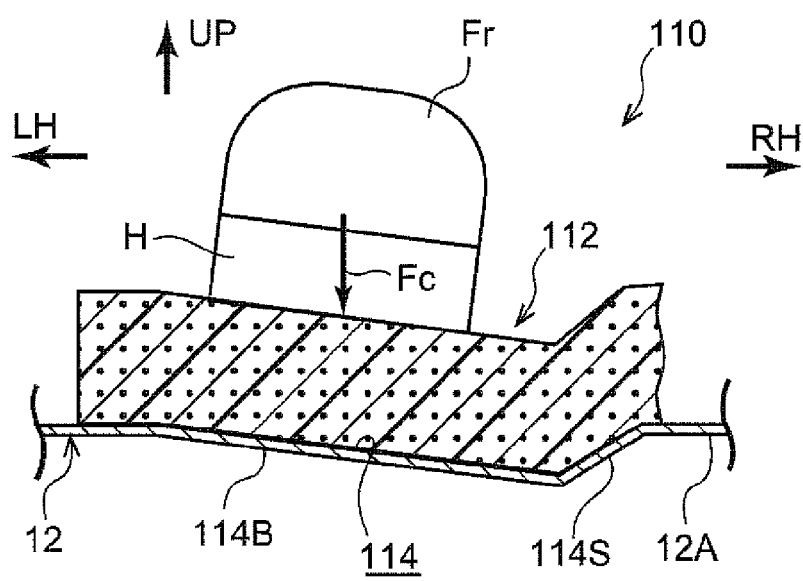
FIG. 22 is a cross-sectional view that is seen from the vehicle rear and schematically shows a deformed state of a tibia pad that structures the right foot protecting structure relating to the sixth embodiment of the present invention.

In this floor portion structure 110, when compressive load Fc is received from the right foot Fr, as shown in FIG. 22, the tibia pad 112 deforms and contacts the inclined bottom wall 114B and the inclined side wall 114S (hits the bottom), and, from this state, absorption of collision energy is started. At this time, the top surface of the tibia pad 112 that has a constant thickness is deformed in a shape that is inclined downwardly to the right along the inclined bottom wall 114B at the load input range Af.

Due thereto, in the floor portion structure 110 relating to the present embodiment, the cancelling moment Mc is generated mainly by the first mechanism. Note that the inclination angle of the shape that is inclined downwardly to the right of the top surface of the tibia pad 112 (i.e., the cancelling moment Mc that is generated) is set by angle θ4 that is formed by the plane of the opening of the concave portion 114 (the general surface 12A of the dash panel 12) and the inclined bottom wall 114B.

Accordingly, in accordance with the floor portion structure 110 relating to the sixth embodiment as well, with regard to the suppression of inward rotation of the right foot Fr, similar effects can be obtained by operation that is basically similar to the floor portion structure 70 relating to the fourth embodiment.

Further, in the floor portion structure 110, absorption of collision energy due to compressive deformation of the tibia pad 112 is achieved after the bottom-hitting of the tibia pad 112. Namely, absorption of collision energy by compressive deformation of the tibia pad 112 can be carried out while the above-described cancelling moment Mc is generated.

Note that, in the above-described respective embodiments and respective modified examples, examples are illustrated in which the load input range Af (the placement portion of the right foot Fr) is set at (the inclined portion that corresponds to) the front portion 16F, that is supported by the dash panel 12, at the tibia pad 16 or the like. However, the present invention is not limited to this. For example, there may be a structure in which the load input range Af is set at a horizontal portion that is supported by the floor panel 14. Further, the tibia pad is not limited to a structure having a front portion that is an inclined portion and a rear portion that is a horizontal portion, and may be a structure having, among an inclined portion and a horizontal portion, only a portion at which the load input range Af is set.

Further, in the above-described respective embodiments and respective modified examples, examples are illustrated in which the tibia pad 16 or the like is structured by a foamed material, but the present invention is not limited to this. For example, the tibia pad may be structured by a structural body of resin at which a difference in left and right deformation amounts with respect to the compressive load Fc is set by the density or the dimensions of ribs, or the like.

Moreover, in the above-described first through third embodiments, examples are illustrated in which the load (reaction force) that is needed for compressive deformation of a unit amount at the load input range Af (the dispersion range in the vehicle transverse direction) increases gradually or in a stepwise manner from the right side portion toward the left side portion. However, the present invention is not limited to this. For example, there may be a structure in which, due to two foamed materials having different foaming ratios being lined-up in the vehicle transverse direction, the load that is needed for compressive deformation of a unit amount is greater at the left side than at the right side, with the boundary being the boundary surface of these two foamed materials.

In addition, it goes without saying that the present invention can be implemented by being modified appropriately within a scope that does not depart from the gist thereof.

The invention claimed is:

1. A right foot protecting structure comprising an impact absorbing portion that is provided at a portion, where a right foot of a vehicle occupant is placed, at a floor portion of a vehicle, and that, in a case of receiving compressive load from the right foot at a time of a vehicle collision, is deformed such that a right side portion in a vehicle transverse direction at a region of contact with the right foot gradually or in a stepwise manner becomes lower than a left side portion, or is deformed such that the left side portion in the vehicle transverse direction at the region of contact with the right foot generates reaction force that becomes larger gradually or in a stepwise manner than the right side portion.

2. The right foot protecting structure of claim 1, wherein the impact absorbing portion is structured to include a tibia pad that is structured such that load that is needed for compressive deformation of a unit amount becomes greater gradually or in a stepwise manner at the left side portion in the vehicle transverse direction at the region of contact with the right foot than at the right side portion.

3. The right foot protecting structure of claim 2, wherein the tibia pad is structured such that, by having portions where the load needed for compressive deformation of a unit amount differs, the load that is needed for compressive deformation of a unit amount becomes greater gradually or in a stepwise manner at the left side portion in the vehicle transverse direction at the region of contact with the right foot than at the right side portion.

4. The right foot protecting structure of claim 3, wherein the tibia pad is structured due to a first member, and a second member at which the load that is needed for compressive deformation of a unit amount is greater than at the first member, being superposed such that a thickness of the first member becomes thicker gradually or in a stepwise manner at a right side than at a left side in the vehicle transverse direction.

5. The right foot protecting structure of claim 4, wherein
the first member and the second member are respectively structured by foamed materials, and
a foaming ratio of the foamed material that structures the first member is made to be greater than a foaming ratio of the foamed material that structures the second member.

6. The right foot protecting structure of claim 2, wherein the tibia pad is structured by a foamed material whose foaming ratio decreases gradually or in a stepwise manner from a right side in the vehicle transverse direction toward a left side.

7. The right foot protecting structure of claim 2, wherein the tibia pad is structured such that a void ratio becomes greater gradually or in a stepwise manner at a right side than at a left side in the vehicle transverse direction.

8. The right foot protecting structure of claim 7, wherein the tibia pad is formed from a single material, and is structured such that the void ratio is greater at the right side than at the left side in the vehicle transverse direction due to a void, that is deeper at the right side than at the left side in the vehicle transverse direction, being formed therein.

9. The right foot protecting structure of claim 7, wherein the tibia pad is formed from a single material in which plural holes or notches are formed, and is structured such that the void ratio is greater at the right side than at the left side in the vehicle transverse direction due to dimensions, in a direction compressed by the right foot, of the plural holes or notches being formed to be greater at the right side than at the left side in the vehicle transverse direction.

10. The right foot protecting structure of claim 1, wherein the impact absorbing portion is structured to include:
a tibia pad that is structured to include a first portion, and a second portion that is thinner than a thickness of the first portion and that is disposed at a left side in the vehicle transverse direction with respect to the first portion, the tibia pad receiving the compressive load; and
a supporting portion that is provided at the floor portion and that supports a portion, that includes the first portion and the second portion, of the tibia pad from an opposite side of a side of input of the compressive load.

11. The right foot protecting structure of claim 10, wherein
the supporting portion has plural convex portions whose protruding heights from the floor portion become lower at a right side than at a left side in the vehicle transverse direction, and
the first portion and the second portion are formed due to plural notched portions, in which the plural convex portions are placed, being formed in the tibia pad.

12. The right foot protecting structure of claim 10, wherein
the supporting portion is structured as a protruding portion whose protruding height becomes lower gradually or in a stepwise manner at a right side than at a left side in the vehicle transverse direction, and
at the tibia pad, a portion of varying thickness, that becomes thinner gradually or in a stepwise manner at the left side than at the right side in the vehicle transverse direction, is structured to include the first portion and the second portion.

13. The right foot protecting structure of claim 1, wherein the impact absorbing portion is structured to include:
a tibia pad that receives the compressive load from the right foot; and
a stopper portion that is formed in the floor portion so as to not contact a bottom surface of the tibia pad, beneath a portion where the right foot of the vehicle occupant is placed at the tibia pad, and that supports the tibia pad, that is in a state of having been deformed by the compressive load so as to be lower at a right side than at a left side, from an opposite side of a side of input of the compressive load.

14. The right foot protecting structure of claim 13, wherein
the stopper portion is a bottom surface of a concave portion that is deeper at a right side than at a left side in the vehicle transverse direction, and
a thickness of the tibia pad is constant in the vehicle transverse direction, and the tibia pad is supported by the floor portion at both sides in the vehicle transverse direction with respect to the concave portion.

* * * * *